(12) United States Patent
Perlman et al.

(10) Patent No.: US 8,307,922 B2
(45) Date of Patent: *Nov. 13, 2012

(54) SYSTEM AND METHOD FOR POWERING AN AIRCRAFT USING RADIO FREQUENCY SIGNALS AND FEEDBACK

(75) Inventors: Stephen G. Perlman, Palo Alto, CA (US); Antonio Forenza, Austin, TX (US)

(73) Assignee: Rearden, LLC, San Francisco, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 12/291,856

(22) Filed: Nov. 14, 2008

(65) Prior Publication Data

US 2010/0224725 A1    Sep. 9, 2010

Related U.S. Application Data

(63) Continuation-in-part of application No. 11/136,946, filed on May 24, 2005, now Pat. No. 7,451,839.

(51) Int. Cl.
*B60L 9/00* (2006.01)
(52) U.S. Cl. .......................... 180/2.1; 342/372
(58) Field of Classification Search .............. 180/2.1, 180/167, 168, 169; 244/1 R, 189; 342/372
See application file for complete search history.

(56) References Cited

U.S. PATENT DOCUMENTS

| | | | |
|---|---|---|---|
| 3,887,925 A | 6/1975 | Ranghelli et al. | |
| 4,331,225 A | 5/1982 | Bolger | |
| 4,943,811 A | 7/1990 | Alden et al. | |
| 4,955,562 A | 9/1990 | Martin et al. | |
| 5,045,862 A | 9/1991 | Alden et al. | |
| 5,321,414 A | 6/1994 | Alden et al. | |
| 5,400,037 A * | 3/1995 | East | 342/372 |

(Continued)

FOREIGN PATENT DOCUMENTS

CA    1307842    9/1992

(Continued)

OTHER PUBLICATIONS

"PCT International Search Report and Written Opinion", PCT/US2009/063932, (Jan. 7, 2010), 12 pages.

(Continued)

*Primary Examiner* — John Walters
(74) *Attorney, Agent, or Firm* — Blakely, Sokoloff, Taylor & Zafman, LLP

(57) ABSTRACT

A system and method are described for powering an aircraft using radio frequency ("RF") signals. For example, a method according to one embodiment of the invention comprises: positioning an antenna array beneath or on the road surface of a roadway, the antenna array configured to transmit RF signals responsive to RF processing logic and/or circuitry; coupling a rectenna array to an aircraft, the rectenna array configured to receive the RF signals transmitted from the antenna array and to generate power from the RF signals; providing feedback signals from the aircraft to the RF processing logic and/or circuitry, the feedback signals including channel state information (CSI) defining a current state of the channels between the antenna array and the rectenna array, the RF processing logic and/or circuitry using the channel state information to adjust the RF signal transmissions from the antenna array to improve the efficiency of the power generated by the rectenna array; and using the power generated by the rectenna array to power the aircraft.

14 Claims, 23 Drawing Sheets

U.S. PATENT DOCUMENTS

| | | | |
|---|---|---|---|
| 5,503,350 A | | 4/1996 | Foote |
| 5,563,614 A | | 10/1996 | Alden et al. |
| 5,742,253 A | * | 4/1998 | Conroy et al. ............... 342/372 |
| 5,982,139 A | * | 11/1999 | Parise ........................... 320/109 |
| 6,114,834 A | | 9/2000 | Parise |
| 6,364,253 B1 | | 4/2002 | Cavanagh |
| 6,792,259 B1 | | 9/2004 | Parise |
| 6,919,847 B2 | * | 7/2005 | Caplan et al. ................. 343/705 |
| 6,919,857 B2 | | 7/2005 | Shamblin et al. |
| 2006/0023803 A1 | * | 2/2006 | Perlman et al. ............... 375/267 |
| 2006/0266564 A1 | | 11/2006 | Perlman |
| 2008/0089396 A1 | | 4/2008 | Zhang et al. |

FOREIGN PATENT DOCUMENTS

| | | |
|---|---|---|
| CA | 1309769 | 11/1992 |
| CA | 2011298 | 5/1999 |
| CA | 2006481 | 9/1999 |
| JP | 5-231858 H | 7/1993 |
| JP | 2004-229425 | 8/2004 |
| JP | 2004-242380 | 8/2004 |
| JP | 2005-73313 | 3/2006 |
| WO | 2004045884 A1 | 6/2004 |
| WO | WO-2005/064871 | 7/2005 |

OTHER PUBLICATIONS

"PCT International Search Report and Written Opinion", PCT/US2009/063935, (Feb. 3, 2010), 11 pages.

Joho, D. et al., "Articles of the Electronic Information and Communications Society", vol. J87-C, No. 5, May 2004, pp. 1-19.

Kreith, F. et al., "Efficiency of Advanced Ground Transportation Technologies", Journal of Energy Resources Technology, Copyright 2002 by ASME, Sep. 2002, vol. 124, pp. 173-179.

"Well-to-Wheels Analysis of Advanced Fuel/Vehicle Systems—A North American Study of Energy Use, Greenhouse Gas Emission, and Criteria Pollutant Emissions", May 2005, pp. 238.

Demirdöven N., et al., "Hybrid Cars Now, Fuel Cell Cars Later", Aug. 13, 2004, vol. 305 Science, pp. 974-976, www.sciencemag.org.

Hoeffert, M. et al., "Climate Change and Energy, Overview", Encyclopedia of Energy, vol. 1, Copyright 2004, Elsevier, Article No. NRGY:00396, pp. 23 total.

Toyota Special Reports, Toyota FCHV—The First Step Toward the Hydrogen Society of Tomorrow, "Accelerating Towards a Hydrogen Society through Fuel Cell Vehicles", pp. 1-8.

Wampfler, Inc., Home page, Wampfler, Inc., KY USA—Wampfler Group, 1 page, printed on Apr. 17, 2006, http://www.wampfler.us/.

Friends of CRC, "The Friends of CRC Association", Home page, printed on May 14, 2008, pp. 3, http://www.friendsofcrc.ca/.

Friends of CRC, SHARP (Stationary High Altitude Relay Platform), http://www.friendsofcrc.ca/Projects/SHARP.html, page created on Jun. 25, 1996 by Cynthia Boyko, pp. 1-6.

www.tfcbooks.com Resource cite on Nikola Tesla.

Tesla's Experiments with Electric Cars, Teslas FAQ No. 15, Interesting Facts about Nikola Tesla . . . , Twenty First Century Books, Could you write something about Tesla's experiments with electric cars?, pp. 1, http://www.tfcbooks.com/teslafaq/q&a_015.htm.

Regenerative Power and Motion, "Electric Highway Vehicles", printed on Apr. 17, 2006, pp. 1-12, http://home.earthlink.net/~fradella/car.htm.

Oman, H. et al., "Eventful Developments in Energy Conversion", Conference Report, IEEE AESS Systems Magazine, Jan. 2002, pp. 34-40.

PCT Search Report, PCT/US06/14854, mailed May 8, 2008, pp. 3.

Written Opinion, PCT/US06/14854, mailed May 8, 2008, pp. 3.

MIT Media Lab, "Wireless Power—From Wirelessly Powered Car to Wirelessly Powered Fabrication", MAS 863, Final Project WebPage, pp. 1-5, 2002, http://media.mit.edu/physics/pedagogy/fab/fab_2002/personal_pages/akshay/mit.edu/index42.html.

W.H. Weedon et al., "MEMS—switched reconfigurable antennas", IEEE Antennas and Propagation Society, AP-S International Symposium (Digest), vol. 3, pp. 654-657, 2001.

B.A. Cetiner et al., "Multifunctional Reconfigurable MEMS Integrated Antennas for Adaptive MIMO Systems", Adaptive Antennas and MIMO Systems for Wireless Systems, IEEE Communications Magazine, vol. 42, No. 12, Dec. 2004, pp. 62-70.

G.H. Huff et al., "A Novel Radiation Pattern and Frequency Reconfigurable Single Turn Square Spiral Microstrip Antenna", IEEE Microwave and Wireless Components Letters, vol. 13, No. 2, Feb. 2003, pp. 57-59.

Cetiner et al., "A Reconfigurable Spiral Antenna for Adaptive MIMO Systems", EURASIP Journal on Wireless Communications and Networking 2005:3, 382-389, plus International Journal of Digital Multimedia Broadcasting, Special Issue on: Audio Coding, Indexing, and Effects for Broadcasting Applications, Call for Papers Hindawi Publishing Corporation, http://www.hindawi.com, pp. 1, and Special Issue on: Advances in 3DTV: Theory and Practice, Call for Papers Hindawi Publishing Corporation, http://www.hindawi.com, pp. 1.

Wennestrom et al., "An Antenna Solution for MIMO Channels: The Switched Parasitic Antenna", IEEE International Symposium on Personal, Indoor and Mobile Radio Communications, PIMRC, vol. 1, pp. 159-163, 2001.

Piazza et al., "Design and Evaluation of a Reconfigurable Antenna Array for MIMO Systems", IEEE Transactions on Antennas and Propagation, vol. 56, No. 3, Mar. 2008, pp. 869-881.

Dighe et al., "Analysis of Transmit-Receive Diversity in Rayleigh Fading", IEEE Transactions on Communications, vol. 51, No. 4, Apr. 2003, pp. 694-703.

Jørgen Bach Anderson, "Antenna Arrays in Mobile Communications: Gain, diversity, and Channel Capacity[1]", IEEE Antennas and Propagation Magazine, vol. 42, No. 2, Apr. 2000, pp. 12-16.

Tse et al., "Performance Tradeoffs between Maximum Ratio Transmission and Switched-Transmit Diversity", in Proc. $11^{th}$ IEEE International Symposium on Personal, Indoor and Mobile Radio Communication, vol. 2, pp. 1485-1489, Sep. 2000.

Molisch et al., "MIMO Systems with Antenna Selection", IEEE Microwave Magazine, vol. 5, No. 1, pp. 46-56, Mar. 2004.

I. E. Teletar, "Capacity of Multi-antenna Gaussian Channels", European Trans. on Telecomm., vol. 10, pp. 1-28, Nov. 1999, Pages.

T. Svantesson et al., "On Capacity and Correlation of Multi-Antenna Systems Employing Multiple Polarizations", Proc. IEEE Antennas and Prop. Symp., vol. 3, pp. 202-205.

T. Svantesson et al., "Analysis of Electromagnetic Field Polarizations in Multiantenna Systems", IEEE Transactions on Wireless Communications, vol. 3, No. 2, Mar. 2004, pp. 641-646.

J. Wenger et al., "The Intelligent Highway: A Smart Idea?", Strategy+Business, Booz & Co., Feb. 26, 2008, http://www.strategy-business.com/media/file/leading_ideas-20080226.pdf, pp. 5 total.

*Office Action from Foreign Counterpart* Russian Patent Application No. 2007148006/11(052608), *Translation included*, 7.

PCT/US2009/063935, *Notification Concerning Transmittal of International Preliminary Report on Patentability and Written Opinion of the International Searching Authority*, mailed May 17, 2011, 8 pages.

PCT/US2009/063932, *Notification Concerning Transmittal of International Preliminary Report on Patentability and Written Opinion of the International Searching Authority*, mailed May 17, 2011, 8 pages.

Sasako, M., , et al., "Device for Detecting Abnormality on Wheel Tread of Railcar", *Abstract*, (Sep. 7, 1993), 1 Page.

Tanaka, T., , et al., "Power Supply System of Electric Automobile, Electric Automobile Used for Its System and the Same Power Supply Device", *Patent Abstract*, (Mar. 17, 2005), 1 Page.

"System and Method for Powering a Vehicle Using Radio Frequency Signals and Feedback", *First Office Action* mailed Dec. 7, 2010, U.S. Appl. No. 12/291,858, filed Nov. 14, 2008, pp. 1-12.

Notification of Reason for Rejection office action from foreign counterpart Japan Patent Application No. 2008-513486 mailed Dec. 2, 2010, 2 pages.

Decision of Rejection office action from foreign counterpart Japan Patent Application No. 2008-513486 mailed Jul. 19, 2011, 2 pages.

First office action from foreign counterpart China Patent Application No. 200680021909.9 mailed Feb. 25, 2011, 4 pages.

Second office action from foreign counterpart China Patent Application No. 200680021909.9 mailed Sep. 5, 2011, 4 pages.

Notice to File a Response from foreign counterpart Korea Patent Application No. 10-2007-7028402 dated Jul. 31, 2012, 7 pages.

\* cited by examiner

SYSTEM AND METHOD FOR POWERING AN AIRCRAFT USING RADIO FREQUENCY SIGNALS AND FEEDBACK

CLAIM OF PRIORITY

This application is a continuation in part of application Ser. No. 11/136,946 filed May 24, 2005 now U.S. Pat. No. 7,451,839.

BACKGROUND OF THE INVENTION

1. Field of the Invention

This invention relates generally to the field of vehicle propulsion systems. More particularly, the invention relates to an improved system and method for powering a vehicle using radio frequency signals.

2. Description of the Related Art

1. Introduction

Developing vehicles which reduce reliance upon fossil fuels is a matter of critical global importance. Fossil fuels (e.g., gasoline, diesel fuel, natural gas) are used in the vast majority of vehicles in the world because of fossil fuels' high energy density, fast refueling time, relatively low cost, and the maturity of internal combustion ("IC") engines that run on fossil fuels.

The world's heavy reliance on fossil fuels for vehicular power has resulted in a number of problems and concerns. IC engine emissions, despite increasingly stringent controls in many countries, contribute significantly to air pollution and release significant quantities of carbon dioxide, potentially harming the ozone layer and/or contributing to global warming. Many of the world's largest reserves of fossil fuels are in politically unstable areas of the world. Moreover, the world has a finite supply of fossil fuel resources that can be practically obtained. While the exact remaining supply of fossil fuel resources is unknown and a matter of debate, there is universal agreement that at some point (perhaps 25 years, perhaps 100 years) supplies will peak and within an accelerated timeframe thereafter, supplies will be exhausted. Once the milestone event of peak supply and rapid depletion occurs, the cost of fossil fuel is likely to rise dramatically, further worsening the ongoing practicality for society to rely largely on fossil fuels.

A number of prior art systems have been developed and/or proposed over the last century that either eliminate the use of fossil fuels or reduce the use of fossil fuels. In particular, a number of prior art systems have been designed to utilize electricity sourced from the local power grid as energy for vehicle propulsion. Although a large percentage of electrical energy in the current US and world power grid is generated from fossil fuels, with electric-powered vehicles, countries have energy choices when generating electricity such as the type of fossil fuel used (e.g. natural gas, diesel, or coal), nuclear power, hydroelectric power, solar power, and/or wind power. However, with fossil fuel-powered vehicles the energy choices are limited to fossil fuels such as gasoline, diesel, and natural gas that are in liquid or gaseous form and are highly portable. Also, currently in the US, the cost of electric energy to produce a given watt output from an electric motor is typically less than the cost of gasoline to produce a given watt output from a gasoline engine. Of course, it is a complex analysis to compare an electric vehicle's overall efficiency to a gasoline vehicle's, but generally speaking, the energy costs for electric vehicles are less expensive per mile compared to similar gasoline vehicles.

Each prior art system developed and/or proposed in the last century to reduce fossil fuel dependence has its advantages and disadvantages, but to date, none has provided a solution which has the convenience and efficiency of a modern IC-powered automobile and offers a long-term solution that eliminates reliance on fossil fuels Several such prior art systems are reviewed here.

2. Current Vehicle Propulsion Systems (a) Internal Combustion Engines

FIG. 1 illustrates a vehicle powered by a traditional internal combustion ("IC") engine 116, the most common vehicle configuration today. Fuel from a fuel source 180 (e.g., an oil refinery) is transported to fuel pumps 181 maintained at gas stations. Users purchase the fuel at the gas station, and fill up a fuel tank 114 coupled to the vehicle. The fuel is then provided to the IC engine 116 via a fuel line 115.

The IC engine 116 burns the fuel and provides torque to a drive train 117 which interfaces with a transmission 182. The transmission is necessary to allow the engine to run at a rate (typically measured in RPM) which is not directly related to the speed of the vehicle. For example, when the vehicle is stopped (e.g., at a red light), the transmission allows the engine to keep running. Conversely, when the vehicle is moving at a high velocity (e.g., on the highway), the transmission allows the engine to run at a disproportionately low rate. A drive shaft 130 from the transmission 182 applies a force to cause the wheels 111 of the vehicle to rotate. FIG. 1 also illustrates a passenger compartment 100 for containing passengers 101 and a cargo compartment 102 (e.g., a trunk) for cargo 103.

The tires 111 of the vehicle illustrated in FIG. 1 are in contact with a standard road surface or track 150 which may be constructed using various materials (e.g., tar, concrete, steel, etc). In addition, various different materials may be used for the road or track bed 151 beneath the road or track surface 150 (e.g., gravel, wood, soil, etc). A certain amount of debris and/or precipitation 152 may also be found on top of the road surface in a typical outdoor environment.

(b) Electrically-Powered Vehicles

FIG. 2 illustrates a vehicle powered by an electric motor 124. A power source 190 (e.g., the US or international power grid) supplies power to a port 129 on the vehicle via an electric interface 191, which may include a set of connectors, a voltage regulator and/or a transformer. The port 129 is electrically coupled to a charger 127 which charges a set of batteries 122. The batteries provide power to the electric motor 124. A power split device 118 receives current from the electric motor and generates torque via a drive shaft 130 thereby causing the wheels 111 of the vehicle to rotate. In one embodiment, the power split device 118 may include a gearing transmission. Using the forward momentum of the vehicle, the power split device 118 powers a generator 120 which generates an electric current for charging the batteries 122 when the vehicle is breaking or going down hill by recovering energy from the forward momentum of the vehicle. Two examples of the electric vehicle shown in FIG. 2 are the Honda EV+ and the Saturn EV1.

(c) Hybrid Vehicles

FIG. 3 illustrates an exemplary "hybrid" vehicle which runs on both gas and electricity. The power split device 118 in this vehicle allows couplings 125 and 117 to work together to power the drive shaft. More specifically, this vehicle includes both an IC engine 116 and electric motor 124 for generating torque on a drive shaft 130 via the power split device 118. As in the vehicle in FIG. 2, this vehicle also includes a generator 120 for charging the batteries 122 using the forward momentum of the vehicle (e.g., when the vehicle is breaking or going down hill). Examples of the vehicle shown in FIG. 3 include the Lexus RX400h (note, however, that this vehicle is available with a second electric motor to drive the rear wheels) and the Toyota Prius.

FIG. 4 illustrates a hybrid vehicle which includes both an IC engine 116 and electric motor 124. However, unlike the vehicle shown in FIG. 3, this vehicle includes an electricity port 129 and charger 127 for charging the batteries using power from an electric power source 190 (e.g., the US power grid) through electricity interface 191. Given the fact that this vehicle can charge using a standard electrical connection, the batteries 122 of this vehicle are typically larger and can supply more power than the batteries of the vehicle shown in FIG. 3.

(d) Hydrogen Vehicles

FIG. 5 illustrates a vehicle which is similar to the vehicle shown in FIG. 2 but which uses a hydrogen fuel cell 196 to charge the set of batteries 122. The batteries 122 are used in hydrogen-powered vehicles because the fuel cell 196 cannot produce sufficient instantaneous power levels for acceptable vehicle acceleration. Like gasoline, hydrogen from supply 198 is provided to the vehicle via a fuel port 112 and is stored within a hydrogen storage chamber 194.

One problem with hydrogen vehicles is that hydrogen is not readily available as a fuel source. Generally, fossil fuels (e.g. natural gas) are used to produce hydrogen, but this defeats the purpose of a non-fossil fueled vehicle. Although hydrogen may also be produced using electrolysis powered by a electrical source, this process is inefficient and makes hydrogen an unreasonably expensive fuel source.

(e) Conductively-Powered Vehicles

FIG. 6 illustrates a prior art conductively-powered electric vehicle in which power rails/cables 691 are coupled to a power source 190. A power cable 692 is used to establish an electrical connection between the power rails/cables 691 and an electrical port 129 on the vehicle. The port 129 is electrically coupled to a charger 127 which powers a set of batteries 122 which, in turn, provide power to an electric motor 124. The electric motor 124 creates torque to power a drive shaft 130 which rotates a set of tires or wheels 111. As illustrated in FIG. 6, the power source 190 may be connected to the train by a combination of power rails or cables 691 and track 150 (e.g., as in the case of electrically powered trains).

There are many examples of prior art electric vehicles that are powered conductively by an external power source that is physically (i.e., conductively) attached. Such vehicles follow the general architecture illustrated in FIG. 6. Power source 190 is coupled through power connection 693 to power rail(s) or cable(s) 691. Unlike electricity interface 191 of FIG. 2, which couples electricity from a recharging station at a fixed location, power rail(s) or cables(s) 691 in FIG. 6 couple electricity with long and continuous electrical conductors for carrying power over the extent of the vehicle's intended travel (e.g., the two overhead power cables over electric bus routes in San Francisco), and the power cable 192 of FIG. 3 is replaced by power cable 692 that has a conductive interface 694 that rolls or slides on power rail(s) or cable(s) 691 (e.g., the two overhead connectors on electric buses in San Francisco that couple to the two overhead power cables). In some cases, the two conductors of power source 190 are split between a potentially dangerous non-ground single conductor power connection 693 coupled to power rail or cable 691 (e.g. the so-called "third rail" of the New York City subway system), and a harmless ground connection 693 coupled to a conductive track 150 (e.g., the track rails of the New York City subway system). In such a system the power rail or cable 691 typically is physically inaccessible to prevent accidental contact by a person or animal that might result in electric shock.

The charger 127 and batteries 122 shown in FIG. 6 provide temporary power in the event of intermittent connection loss to the power source. However, such vehicles may also be constructed without battery backup with a direct power connection from electricity port 129 to electric motor 124. Also, such vehicles often have a direct mechanical coupling 130 from the electric motor 124 and the tire or wheel 111.

Electric trains or trolleys with powered overhead wires are a common example of conductively-powered electric vehicles. Toy slot cars are another example, with two wires embedded in the track that are coupled to two-wire mesh connectors on the bottom of the car.

Less well known is DICK FRADELLA, ELECTRIC HIGHWAY VEHICLES . . . TECHNOLOGY ASSESSMENT OF FUTURE INTERCITY TRANSPORTATION SYSTEMS published in 1976 titled by University of California at Berkeley's Institute for Transportation Engineering. In this publication, a conductive rolling contact system for electric vehicles on highways was proposed. Using this system, an electric vehicle would have an extended tether that would connect to recessed power strips on the highway and conductively draw power from the highway. According to a website apparently maintained by the paper's author (http://home.earthlink.net/~fradella/car.htm) the US DOT and DOE rejected such a conductive system out of concerns that people might be electrocuted by the conductive power strips. Independent of electrocution risk, another substantive issue was that cars so connected to the conductive power strips would be quite restricted in their maneuverability, much like toy slot cars, in order to utilize the conductive power source. This would require substantial changes to existing car designs and driving procedures. In addition, debris or precipitation 152 (e.g. snow, ice, mud, oil, gravel, trash) could obstruct or interfere with the conductive interface.

(f) Inductively-Powered Vehicles

Another type of vehicle that does not directly rely upon fossil fuels is an inductively-powered electric vehicle. Electromagnetic induction is formally defined as the production of electrical potential difference (voltage) across a conductor located within a changing magnetic flux. A practical example of induction is seen in a transformer. There is no conductive connection between the primary and secondary sides of a transformer; the primary and secondary sides are simply coils of wire in close proximity to one another. When alternating current (AC) is applied to the primary side of a transformer, it induces an AC current in the secondary side of the transformer.

Induction can also be achieved between two parallel non-connected conductors in close proximity to one another. FIG. 7 illustrates how this principle has been applied in prior art inductively-powered electric vehicles. Power source 190 powers primary power supply 791, providing AC power (e.g. 10 to 25 KHz AC is used in a system designed by Wampfler AG of Rheinstrasse, Germany; see www.wampfler.com), which is coupled through power connection 792 to primary cable 794 (which loops back through another cable to power connection 792). Typically, the primary cable 794 is buried within a few centimeters of the surface of the road or track bed 151 or above the surface in an insulated enclosure.

Secondary pickup 795 contains a long conductive element which, depending on the clearance from the vehicle to the road or track bed, may have to be extended from the vehicle body. Secondary pickup 795 must be quite close (within a few centimeters) and maintained in parallel to the primary cable 795 as the vehicle moves. Secondary pickup 795 is coupled to secondary regulator 793 which serves to regulate voltage fluctuations caused by variations in the distance and alignment between secondary pickup 795 and primary cable 794. Secondary regulator 793 is coupled to charger 127, which is coupled through cable 126 to charge batteries 122 which couple through cable 123 to electric motor 124, and/or secondary regulator 793 may be coupled directly to electric motor 124, if the vehicle is to operate only from inductive power without batteries. Electric motor 124 is coupled by mechanical coupling 130 to drive tire or wheel 111.

There are only a few examples of inductively-powered electric vehicles. Wampfler AG, for example, has deployed several inductively-powered systems for electric vehicles. Inductive power has been used for vehicles on manufacturing floors and in other controlled environments. Because of the precise and close relative spacing requirements (e.g. +/−25 mm in one Wampfler AG system) for inductive primaries and secondaries, inductive power transmission is difficult to apply generally to vehicles which may have to operate in a hostile outdoor environment. For example, the debris or precipitation 152 shown in FIG. 7 may obstruct a secondary pickup 795 with only a few centimeters of position tolerance.

(g) Wireless Power Transmission

Transmission of power through radio waves ("wireless power" or "RF power") was pioneered by Nikola Tesla. His Tesla Coil, which demonstrates the principle of RF power transmission, has been a common fixture in science museums and science classes for decades, but it has found little practical application because it is quite inefficient as a wireless power transmitter. Nonetheless, Tesla envisioned a world where wireless power was ubiquitous. There was even one report (see New York Daily News, Apr. 2, 1934, "Tesla's Wireless Power Dream Nears Reality") that Tesla was developing a wirelessly-powered car, details of which were "closely guarded secrets." However, the speculations of this article were never corroborated. A World-Wide Web resource site on Nikola Tesla (www.tfcbooks.com) has compiled a significant amount of information related to Tesla's work. Regarding electric-powered automobiles, the web site states: "While there is no corroborated evidence that Tesla ever built an electric automobile, he is known to have encouraged others to pursue the idea of electric propulsion." (http://www.tfcbooks.com/teslafaq/q&a_015.htm).

Since Tesla's first work with wireless power transmission one hundred years ago, there have been a number of other wireless power transmission experiments and demonstrations.

In the 1960s, William C. Brown helped develop the rectifying antenna ("rectenna"), which converts radio waves to direct current ("DC"). An exemplary rectifying antenna is illustrated in FIG. 8. As taught by William C. Brown and others, a rectenna, when exposed to radio waves (typically in the microwave band) receives transmitted power and converts the microwave power to DC power. A typical rectenna consists of multiple rows of dipole antennas where multiple dipoles belong to each row. Each row is connected to a rectifying circuit which consists of low pass filters 801 and a rectifier 802. A rectifier is typically a GaAs Schottky barrier diode that is impedance-matched to the dipoles by a low pass filter 801. A low-pass filter 801 is a device that cuts frequencies off above a certain point and allows all other frequencies to pass through. Rectennas may also employ capacitors 803 to store charge as it flows through the receiving sub-systems.

Rectenna technology is well-understood by those skilled in the art, and there have been a number of prior art refinements, including U.S. Pat. No. 3,887,925 and U.S. Pat. No. 4,943, 811. Efficiencies as high as 90% have been achieved from transmission of power to reception of power by a rectenna.

Transmission of wireless power to rectennas has been used for, and has been proposed for, many applications. In 1964, William C. Brown demonstrated the transmission of wireless power to a tethered model helicopter with a rectenna.

In the 1980s, the SHARP (Stationary High Altitude Relay Platform) project resulted in a microwave-powered electric airplane with a 15-foot wing span. Its maiden voyage was in 1987, and it eventually was flown to a height of 1500 feet by beaming 12 kilowatts of RF power from the ground to the plane for more than an hour. Only a small fraction of the transmitted RF was received by an on-board rectenna. The work is currently described at http://friendsofcrc.ca/SHARP/sharp.html and in U.S. Pat. Nos. 4,943,811; 5,045,862; 5,321, 414; 5,563,614 and Canadian Patent Nos. 1,307,842; 1,309, 769; 2,006,481; 2,011,298. A ground power transmission system transmitted microwaves to the plane.

Hobbyists and students have also used wireless power for powering motors for other applications. Akshay Mohan describes experiments he conducted in 2002 with wireless power transmission. His initial goal was to develop a vehicle that could divide itself so that at one point in time it could be a family car, and then divide itself at another point in time so that each part individually could be a vehicle a person could drive. He thought initially about coupling independent suspension and transmission mechanisms, and then considered using wireless power transmission to distribute power amongst the various independent parts of the vehicle. The power transmitted was very low power, and was used to power a motor removed from a toy car. The experiment is described at the following URL: http://www.media.mit.edu/physics/pedagogy/fab/fab_2002/personal_pages/akshay/mit.edu/index42.html

SUMMARY

A system and method are described for powering an aircraft using radio frequency ("RF") signals. For example, a method according to one embodiment of the invention comprises: positioning an antenna array beneath or on the road surface of a roadway, the antenna array configured to transmit RF signals responsive to RF processing logic and/or circuitry; coupling a rectenna array to an aircraft, the rectenna array configured to receive the RF signals transmitted from the antenna array and to generate power from the RF signals; providing feedback signals from the aircraft to the RF processing logic and/or circuitry, the feedback signals including channel state information (CSI) defining a current state of the channels between the antenna array and the rectenna array, the RF processing logic and/or circuitry using the channel state information to adjust the RF signal transmissions from the antenna array to improve the efficiency of the power generated by the rectenna array; and using the power generated by the rectenna array to power the aircraft.

BRIEF DESCRIPTION OF THE DRAWINGS

A better understanding of the present invention can be obtained from the following detailed description in conjunction with the drawings, in which.

DETAILED DESCRIPTION OF PREFERRED EMBODIMENTS

Described below is an improved apparatus and method for powering a vehicle. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

One embodiment of the invention powers a vehicle using wireless radio frequency signals transmitted from an antenna embedded within a roadway to a rectenna on the vehicle. The rectenna may be positioned on the underbody of the vehicle and may be configured to receive the RF signals as the vehicle passes over the transmitting antenna.

Figure 9:
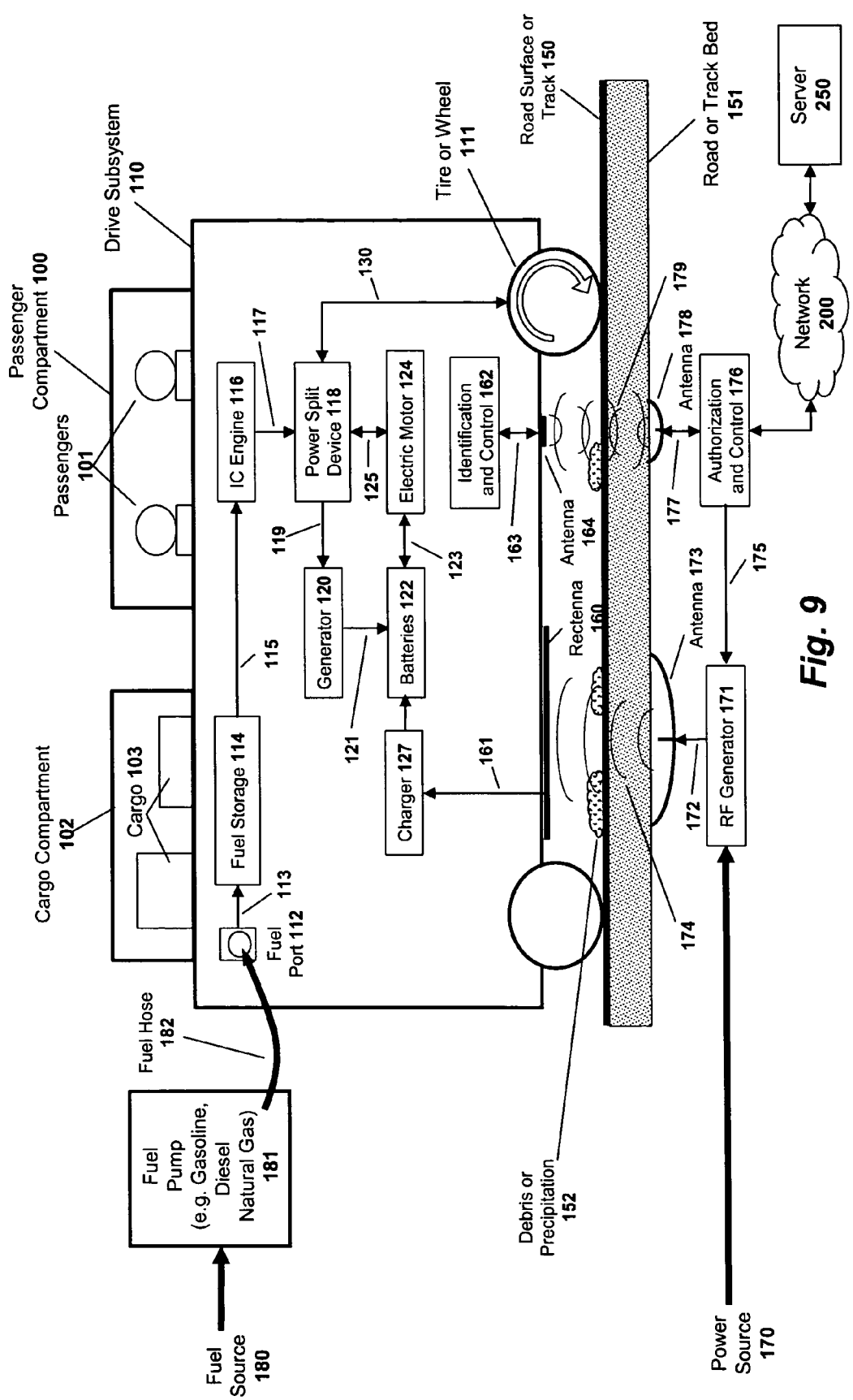
FIG. 9 illustrates one embodiment of the invention in which RF generators are configured beneath a road surface.

FIG. 9 illustrates one embodiment which includes an RF generator unit 171 positioned beneath the road surface 150 and coupled to a transmitting antenna 173. The RF generator is configured to transmit RF signals 152 via antenna 173 in the direction of vehicles traveling over the road surface 150. In one embodiment, the RF signals 152 are microwave signals. However, the underlying principles of the invention are not limited to any particular portion of the RF spectrum.

In addition, in one embodiment, the RF generator 171 uses an electrical connection to the electrical power grid as a power source 170. However, once again, the underlying principles of the invention are not limited to any particular power source.

In one embodiment of the invention, a rectenna 160 is coupled to the underside of a vehicle and is positioned to receive the RF signals transmitted from the RF generator 171. The rectenna 160 converts the RF signals into DC electrical power. Specifically, the rectenna 160 provides current to a charger unit 127 via electrical connection 161. Using the power from the rectenna 160, the charger unit 127 charges a set of batteries 122. The charger 127, batteries 122, generator 120, electric motor 124 and power split device 118 may be the same (or similar) types as those used in prior electric vehicles. In addition, as illustrated, the vehicle may also be equipped with an IC engine 116 (coupled to the power split device 118 as in prior vehicles).

In one embodiment, a series of RF generators such as RF generator 171 are positioned beneath certain lanes of a highway, separated from one another by a specified distance. As such, vehicles equipped with rectennas 160 and associated charging circuitry are provided with a continuous power source as they drive over these lanes. One embodiment of the invention provides RF generators 171 only beneath the commuter lanes (e.g. sometimes called "High Occupancy Vehicle", HOV, or Carpool lanes) of the highway. However, the underlying principles of the invention are not limited to specific types of lanes configured with RF generators.

Figure 6:
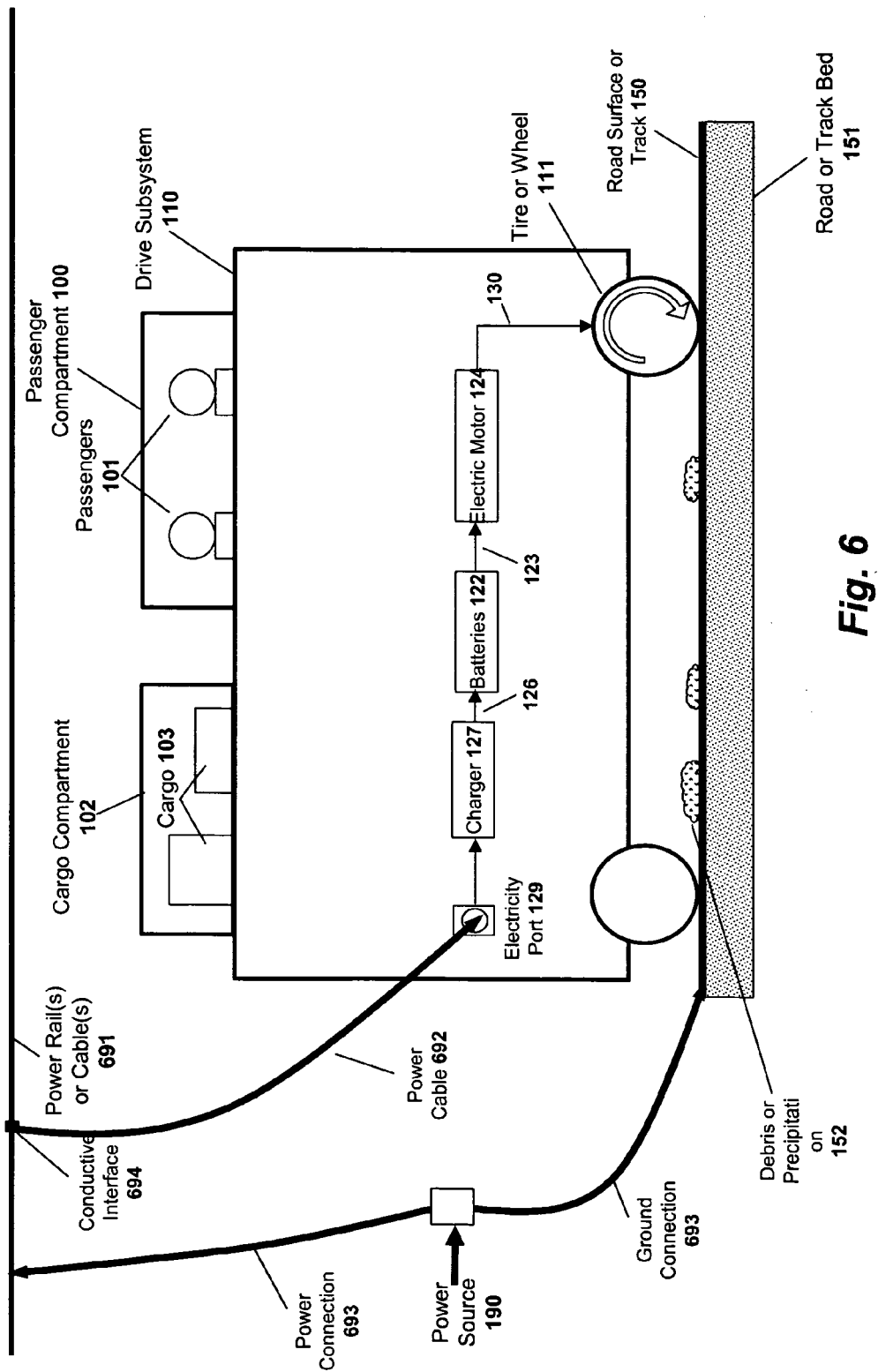
FIG. 6 illustrates a prior art conductively-powered electric vehicle.
Figure 7:
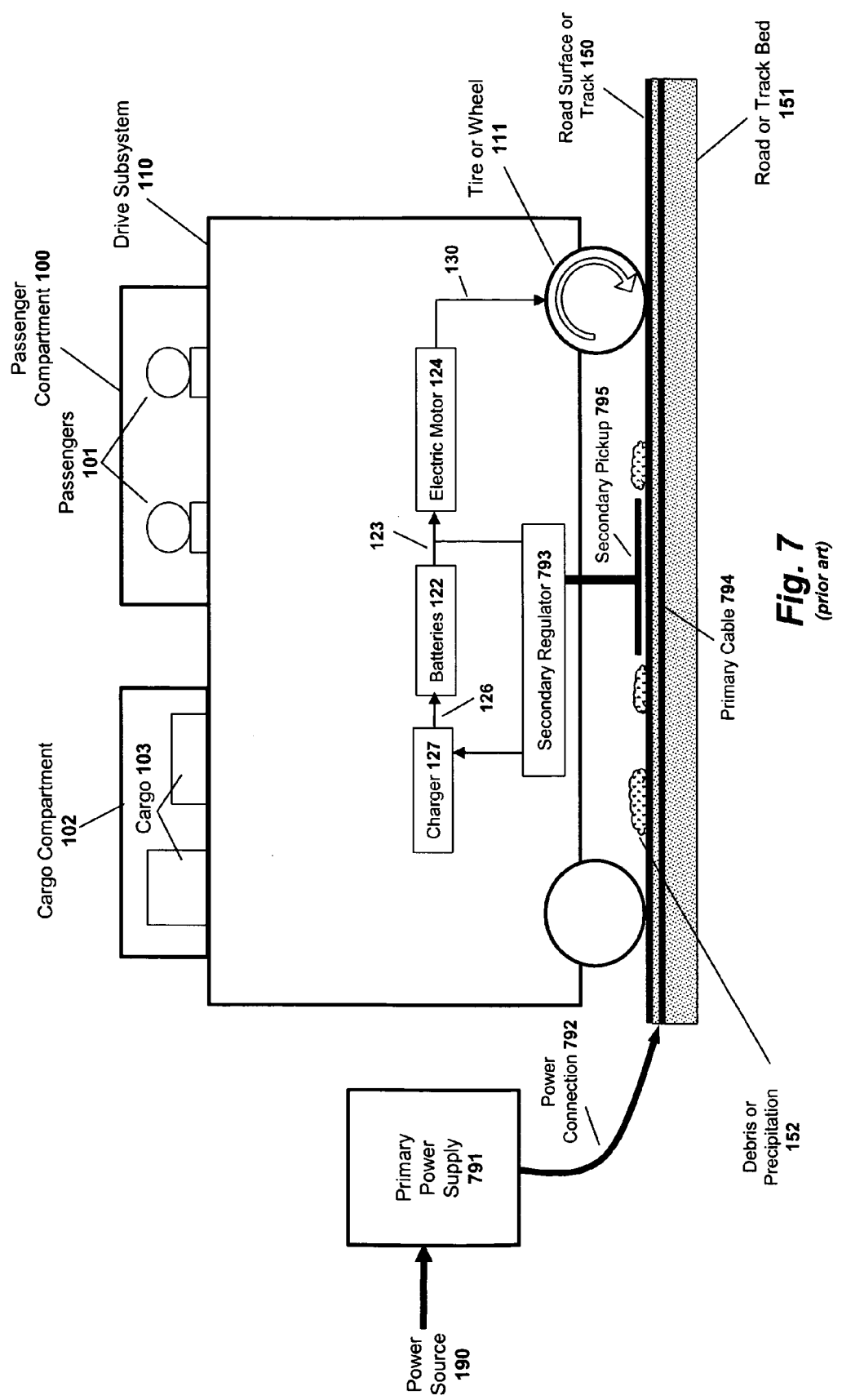
FIG. 7 illustrates a prior art inductively-powered electric vehicle.
Figure 8:
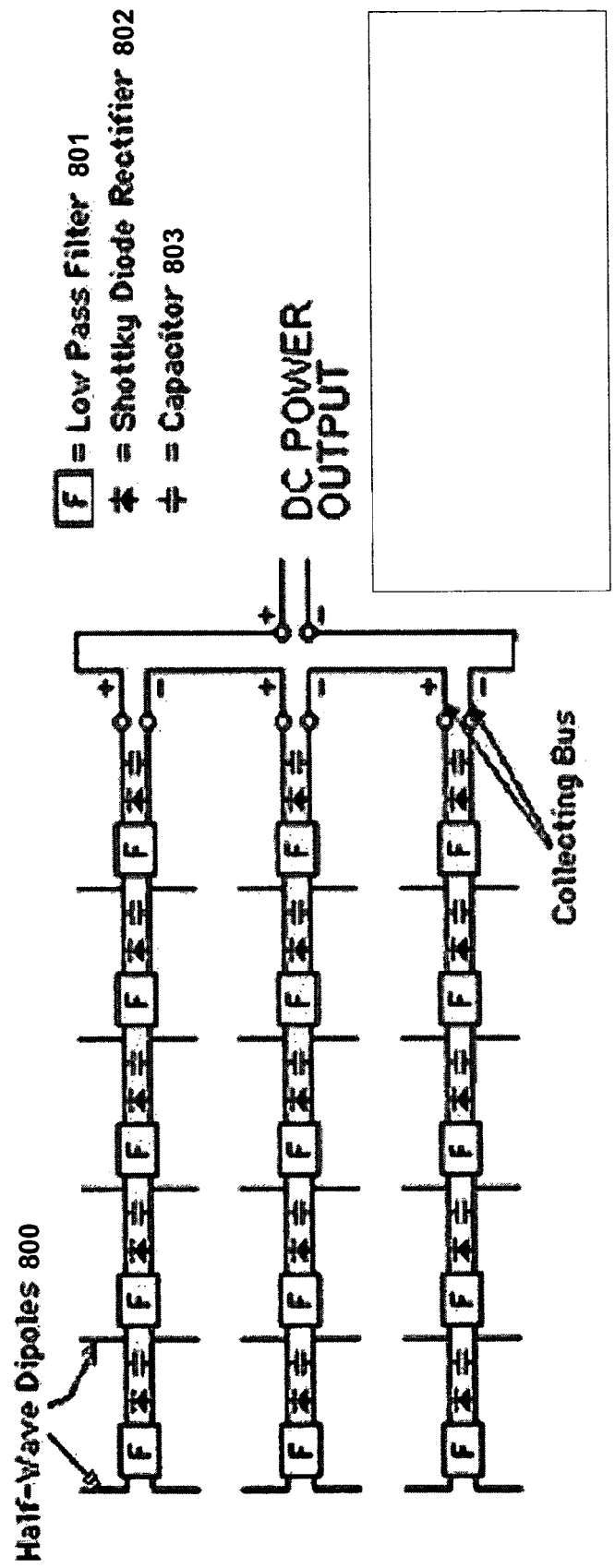
FIG. 8 illustrates a prior art rectifying antenna or "rectenna."

Because power is transmitted using RF, there are substantial advantages over prior art road power systems. Unlike prior art conductively-powered vehicles, such as the one shown in FIG. 6, there is no conductive tether to a power rail or cable 691, and as a result the vehicle illustrated in FIG. 9 has as much mobility as a conventional IC-powered car. Unlike prior inductively-powered vehicles, such as the one shown in FIG. 7, there is no secondary pickup 795 that has to be closely and precisely positioned relative to the primary cable 794. RF power 174 in FIG. 9 will penetrate road or track bed 151, road surface 150, and debris or precipitation 152. And then RF power 174 will transmit through air to rectenna 160, allowing normal clearance between the bottom of the vehicle and the roadway. The precise height and positioning of rectenna 160 relative to antenna 173 can be widely variable (e.g. on the order of 4 feet), and as a result the imprecision that occurs in typical driving from bumps in the road or driver imprecision can be tolerated. The only consequence to imprecise positioning will be some loss of efficiency of the power transmission if the RF transmission 174 partially misses rectenna 160.

In one embodiment, only authorized drivers are provided with access to the RF transmissions from the RF generators 171. For example, in one embodiment, the RF power system described herein is a pay service and only those drivers who subscribe to the service (and who are in good standing) will be provided with access.

To this end, in one embodiment, an authorization and control module 176 is configured to identity authorized drivers and to turn RF generator 171 on only for those drivers via control link 175. In one embodiment, authorization and control module 176 includes an antenna 178 allowing the authorization and control module 176 to wirelessly communicate with identification and control logic 162 configured within the vehicle. As illustrated, the identification and control logic 162 is also equipped with an antenna 164 which, in one embodiment, is positioned on the underside of the vehicle. In operation, as the vehicle travels over the roadway 150, the authorization and control module 176 establishes communication over the wireless channel and reads identification data from the identification and control logic 162 uniquely identifying the driver and/or the vehicle. In one embodiment, the identification data is a serial number associated with the vehicle. However, various other types of identification data may be used while still complying with the underlying principles of the invention. If the driver/vehicle is authorized to use the power system, then the authorization and control module 176 will turn RF generator 171 on as the vehicle passes by, thereby providing power to the vehicle. If the driver/vehicle is not authorized, then the authorization and control module 176 will not turn RF generator 171 on.

Various different configurations for authorization and control module 176 and identification and control logic 162 are contemplated within the scope of the present invention. For example, in one embodiment, the same wireless technology as that currently used to provide access to bridges and tunnels in many metropolitan areas may be employed. One example of this is the "E-Z Pass" used on several toll bridges and toll roads in the northeastern United States. E-Z Pass tags are RFID transponders which communicate with equipment built into the toll collection lanes. The most common type of tag is mounted on the inside of the vehicle's windshield behind the rearview mirror. Some vehicles have windshields that block RFID signals. For those vehicles, an externally-mountable tag may be used, typically designed to attach to the vehicle's front license plate mounting points.

Figure 12:
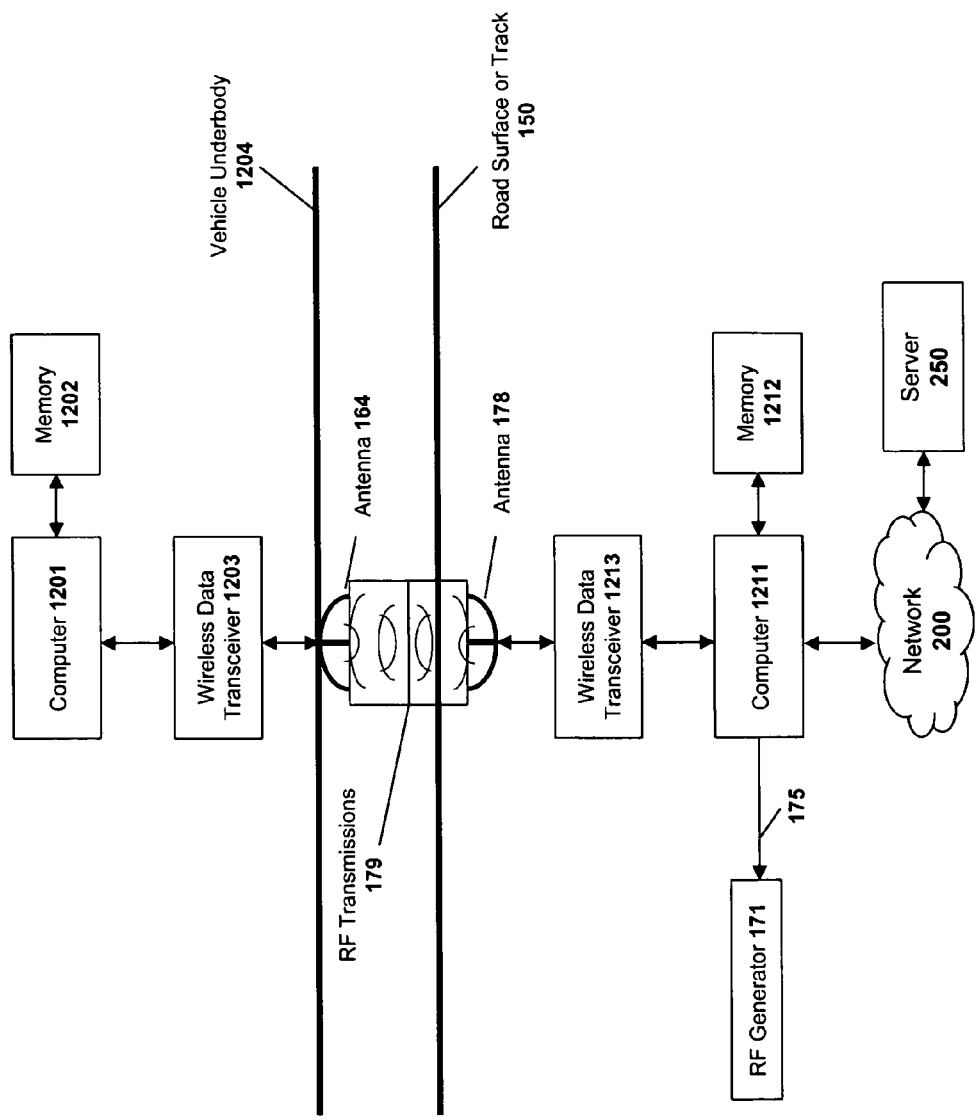
FIG. 12 illustrates a wireless communication architecture employed in one embodiment of the invention.

In one embodiment, identification and control logic 162 and authorization and control module 176 are implemented as detailed in FIG. 12. Identification and control logic 162 of FIG. 9 is implemented by means of computer 1201, memory 1202, and wireless data transceiver 1203. Authorization and control module 176 of FIG. 9 is implemented by means of computer 1211, memory 1212, and wireless data transceiver 1213. Computers 1201 and 1211 are implemented using by using VIA EPIA PC 10000 LVDS PC motherboards, available from VIA Technologies, Inc. of Taiwan, running the Windows XP Professional operating system from Microsoft Corporation. Memory 1202 and 1212 are implemented using commercially available 64 MByte USB Flash Memory modules, plugged into USB ports on computers 1201 and 1211. Wireless data transceivers 1203 and 1213 are implemented using MinilLink Wireless Ethernet adapters from MicroTek Electronics of San Clemente, Calif., and they are coupled to Ethernet ports on computers 1201 and 1211, configured to transmit at 5.260 GHz. The wireless data transceivers 1203 and 1213 are coupled to directional antennas 164 and 178. Although the antennas are shown as external parabolic antennas in FIG. 12 for the sake of illustrating directionality, in one embodiment, they are actually patch antennas that are integral to the MiniLink product. Antenna 164 is mounted on the underbody 1204 of the vehicle. Antenna 178 is embedded under the roadway surface or track 150. In the case of a track, such as that of a train, antenna 178 is placed between the tracks in the track bed.

Figure 13:
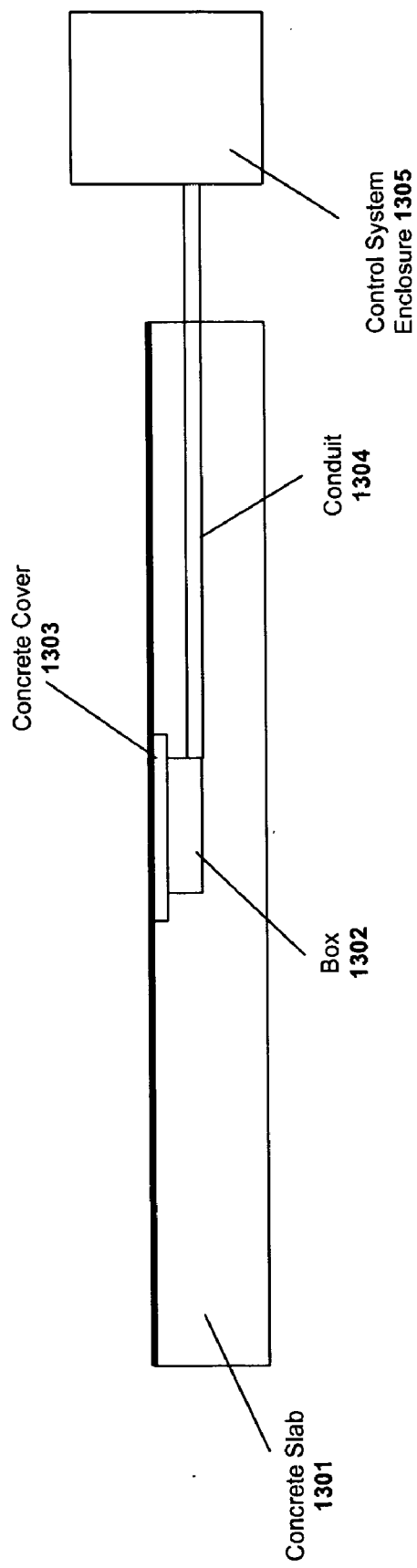
FIG. 13 illustrates one embodiment in which a steel box and conduit are embedded beneath the road surface and includes a control system enclosure for housing a control system.

The MiniLink product is designed to transmit as far as 30 miles in open air line-of-sight applications, up to 40 Mbps. In a typical road environment, the required transmission distance is much shorter (e.g. 1-2 feet), but there are physical obstacles. The transmission will need to pass in both directions from antenna 178 through a road surface, through debris or precipitation on the road, through 1 to 2 feet of air, and then through any dirt or grime that has accumulated on antenna 164. Of course, it is possible to bury antenna 178 very deeply, or under a road surface 150 that blocks RF in the 5 GHz band (e.g., a road surface made of solid steel), in such a manner that the RF signal would be unable to penetrate through the road, but there are many practical materials and practical thicknesses that can be used. FIG. 13 (not drawn to scale) illustrates one such practical embodiment. The road surface is made of a concrete slab 1301 that is 12 inches thick and made of portland cement. A steel box 1302 (with an open top) is embedded in concrete slab 1301 when the cement is poured that is large enough to accommodate the MiniLink product (the MiniLink dimensions are 2.6"×2.6"×1.1"). A 1 inch thick concrete cover 1303 is placed on top of box 1302, typically made of steel. Conduit 1304, typically made of steel, is also embedded in concrete slab 1301 when it is poured, and carries a power cable and an Ethernet cable to the MiniLink product from a weatherproof enclosure on the side of the roadway where computer 1211 and memory 1212 are located. The MiniLink patch antenna is pointed upward, and RF is transmitted through concrete cover 1303.

RF generator 171 of FIG. 9 can be implemented using any of many commercially available RF power generator systems, typically implemented using a magnetron at microwave frequencies, for example, 2.45 GHz. In one embodiment Magnetron Generator model VIS-201 from CPI Wireless Solutions of Palo Alto, Calif. is used. The VIS-201 is capable of generating from 1.5 to 30 KWatts of RF output. RF generator 171 is coupled to a transmitting antenna 173 through either a cable or waveguide 172. Transmitting antenna 173 typically is a directional antenna, which can be implemented as a parabolic dish, a yagi antenna or many other prior art directional antennas. Also, transmitting antenna 173 can be implemented as a prior art group of antennas in a phased array with the RF signal appropriately processed to shape the antenna output in a directional beam. In this embodiment the antenna 173 is a parabolic dish.

Figure 14:
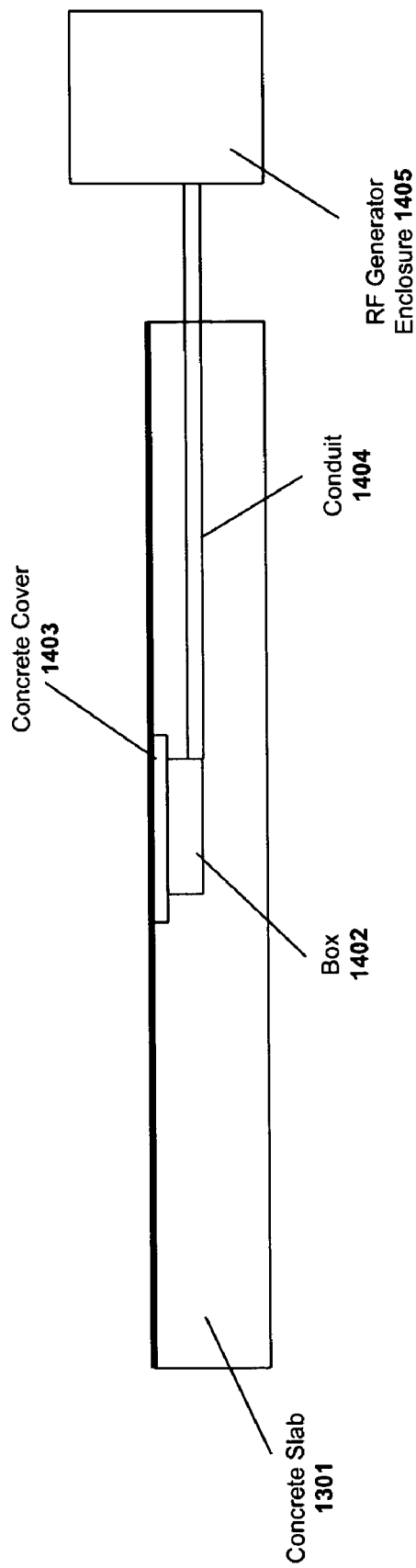
FIG. 14 illustrates one embodiment which includes a weatherproof enclosure for housing an RF generator.

FIG. 14 shows one embodiment where these subsystems would be placed. Weatherproof enclosure 1405 is located on the side of the road for RF generator 171. Conduit 1404 (typically made of steel) to house cable or waveguide 172 is embedded in concrete slab 1301 when it is poured. Antenna 173 is housed in box 1402, which is placed in the concrete slab 1301 when it is poured. Concrete cover 1403 is a 1 inch thick concrete cover for box 1402.

Figure 15:
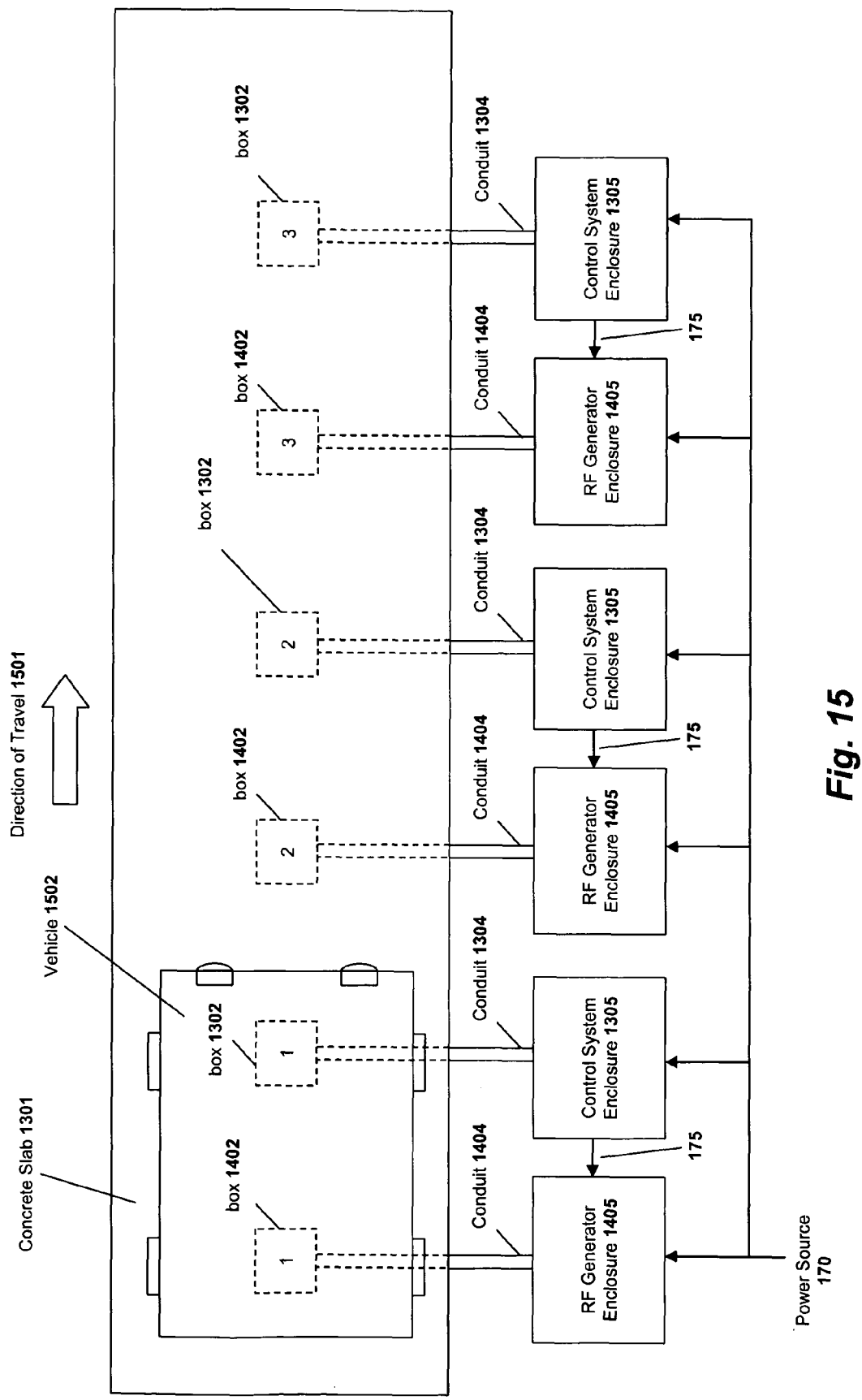
FIG. 15 illustrates a bird's eye architectural view of a system according to one embodiment of the invention.

FIG. 15 shows one embodiment of a plan (overhead) view of the structures illustrated in FIGS. 13 and 14. Concrete slab 1301 forms a short segment of roadway roughly 50 feet long (in practice, the roadway so configured would stretch for miles). Vehicle 1502 is shown moving on the roadway in direction of travel 1501. At the moment in time shown, vehicle 1502 is about one-third of the way down segment 1301 of roadway.

Three RF power subsystems are shown in FIG. 15, with their respective boxes containing their antennas numbered 1, 2, and 3. Each subsystem consists of an authorization and control system 176, housed in enclosure 1305 and an RF generator 171, housed in enclosure 1405. The previously described connections from enclosures 1305 and 1405 are routed through conduits 1304 and 1404, respectively, to boxes 1302 and 1402, respectively. Conduits and boxes 1305, 1405, 1302 and 1402 are shown with dashed lines where they are embedded in concrete slab 1301. Wireless data transceiver 1213 and antenna 176 are located in box 1302 and antenna 173 is located in box 1402.

In one embodiment, vehicle 1502 is the same vehicle that is illustrated in FIG. 9. When vehicle 1502 drives over concrete slab 1301, its identification and control system 162 is constantly and repeatedly transmitting an identification number through antenna 164, modulated as a digital signal by wireless data transceiver 1203. This identification number may have been pre-programmed into memory 1202 of FIG. 12 when the car was manufactured and uniquely identifies the vehicle 1502.

When antenna 164 passes over the box 1302 of FIG. 15 numbered 1, antenna 178 within box 1302 receives the signal, wireless data transceiver 1213 demodulates the signal, and transmits vehicle 1502's identification through Ethernet to computer 1211. Computer 1211 compares the identification number to a database of authorized identification numbers in memory 1212, and if it determines that vehicle 1502 is authorized to be transmitted power, it sends a "transmit power" message through cable 175 to RF generator 171. Then, RF generator 171 transmits power through cable or waveguide 172 to antenna 173, which modulates RF energy 174.

In one embodiment, each pair of boxes 1302 and 1402 are placed a consistent distance of 8 feet apart. Because vehicle 1502's antenna 164 is directional, when it establishes contact with antenna 178, it will be located roughly over antenna 178. Since it is known that box 1402 with RF power transmitting antenna 173 has 8 feet between it and antenna 178, vehicle 1502 is manufactured with its rectenna 160 located 8 feet behind antenna 164. So, when antenna 173 begins transmitting RF power, rectenna 160 is above it and receives the RF power. As previously described, rectenna 160 rectifies the RF power to DC current, which is coupled through cable 161 to charger 127, which then charges batteries 122 to propel the vehicle 1502.

As the vehicle 1502 continues move to the right, eventually antenna 164 loses contact with antenna 178. When this is detected by the authorization and control system 176, it sends a message to RF generator 171 to stop transmitting RF power.

Eventually, vehicle 1502 passes over the second pair of boxes 1302 and 1402 (numbered 2 in FIG. 15). At this point, the exact same process of vehicle identification and authorization, followed by RF power activation and deactivation, occurs, providing vehicle 1502 with another interval of RF power. And, the same process occurs with vehicle 1502 passes over the third pair of boxes 1302 and 1402 (numbered 3 in FIG. 15), and so on. In this way, vehicle 1502 receives a steady sequence of intervals of RF power as it proceeds down the roadway.

Although the distance between antennas 173 and 178 is the same as the distance between antennas 160 and 164, respectively, in FIG. 15, different distances may also be used. For example, to account for the speed of the vehicle and the average time required for authorization and control logic 176 to provide authorization and for RF generator 171 to begin transmitting power in one embodiment, the distance between antennas 173 and 178 may be slightly greater than the distance between antennas 160 and 164 (e.g., 9 feet).

In one embodiment, the authorization and control logic 176 in FIG. 9 communicates with a remote server 250 over a data network 200. The remote server 250 includes a database containing the set of drivers/vehicles who are authorized to use the RF power system described herein. The remote server 250 may continually and/or periodically update this information on authorization and control module 176 to ensure that the authorization and control module 176 includes up-to-date driver/vehicle information. The data network 200 can be a wireless or wired network, a propriety network link or a link to the Internet such as a T1 line or DSL line.

In one embodiment, RF generator 171 in FIG. 9 transmits power constantly, and all vehicles in the lane are permitted to receive power. In this embodiment, identification and control subsystem 162 and authorization and control subsystem 176 are unnecessary.

In another embodiment, RF generator 171 in FIG. 9 transmits power constantly, but rather than authorization and control subsystem 176 causing RF generator 171 to stop transmitting power when an unauthorized vehicle passes, authorization and control subsystem 176 transmits a message to identification and control subsystem 162 that it is not authorized to receive power, and identification and control subsystem 162 sends a message to charger 127 (through a cable connection not shown) that it should decouple any power received on cable 161 received by the rectenna 160. This embodiment would be a useful configuration if RF generator 171 could not be switched on and off quickly.

Figure 10:
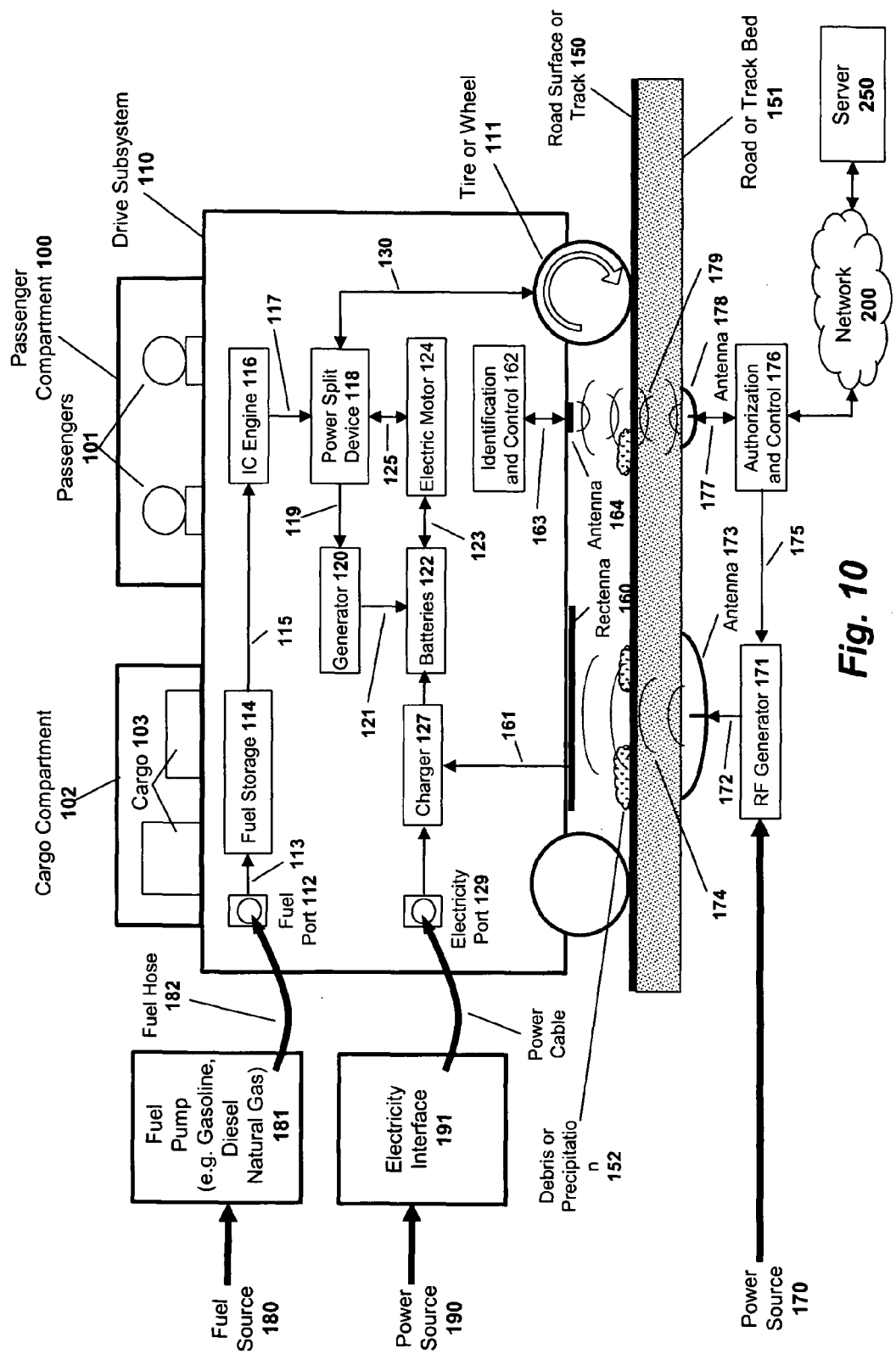
FIG. 10 illustrates another embodiment of the invention in which RF generators are configured beneath the road surface.

FIG. 10 illustrates one embodiment of the invention in which, in addition to the rectenna input 161, charger 127 is provided with an electricity port 129 for connecting the charger to an external power source 190 (e.g., a standard 120 V AC power input). As in prior electric vehicles, the electricity interface 191 may include a set of connectors, a regulator and/or a transformer.

Figure 1:
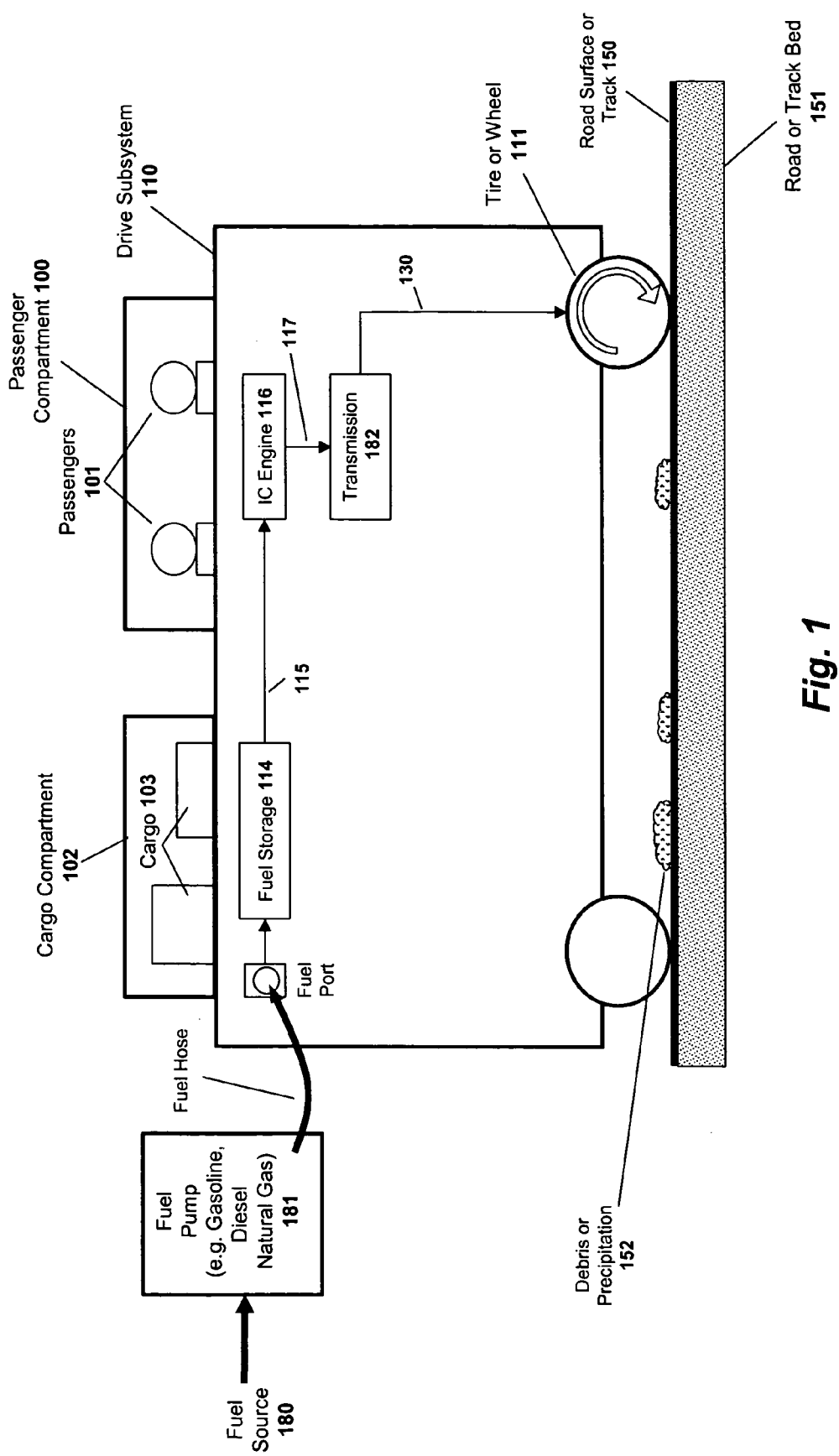
FIG. 1 illustrates a prior art internal combustion ("IC") vehicle which runs on fossil fuels.
Figure 2:
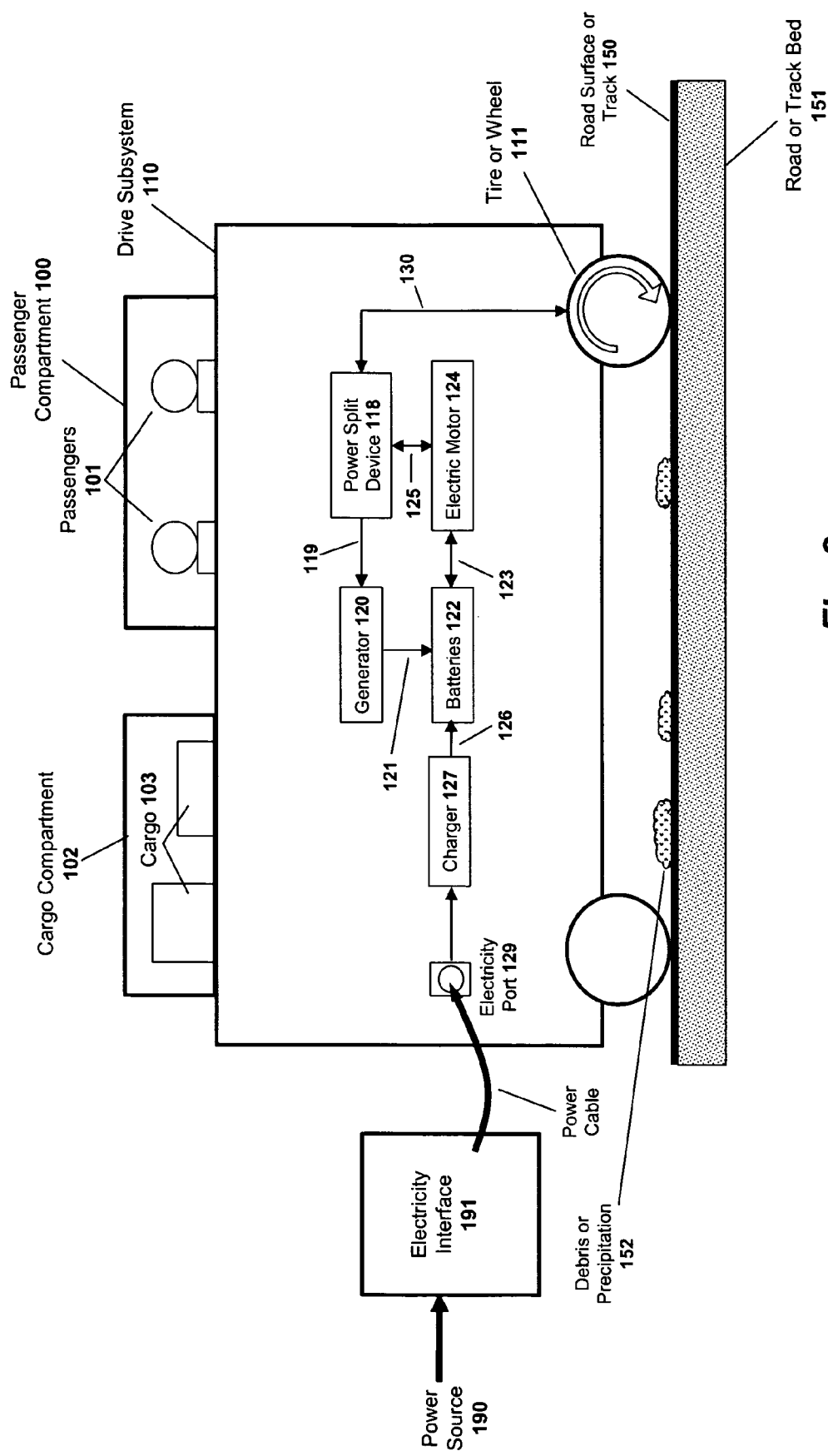
FIG. 2 illustrates a prior art electric vehicle which is powered by a set of rechargeable batteries.
Figure 3:
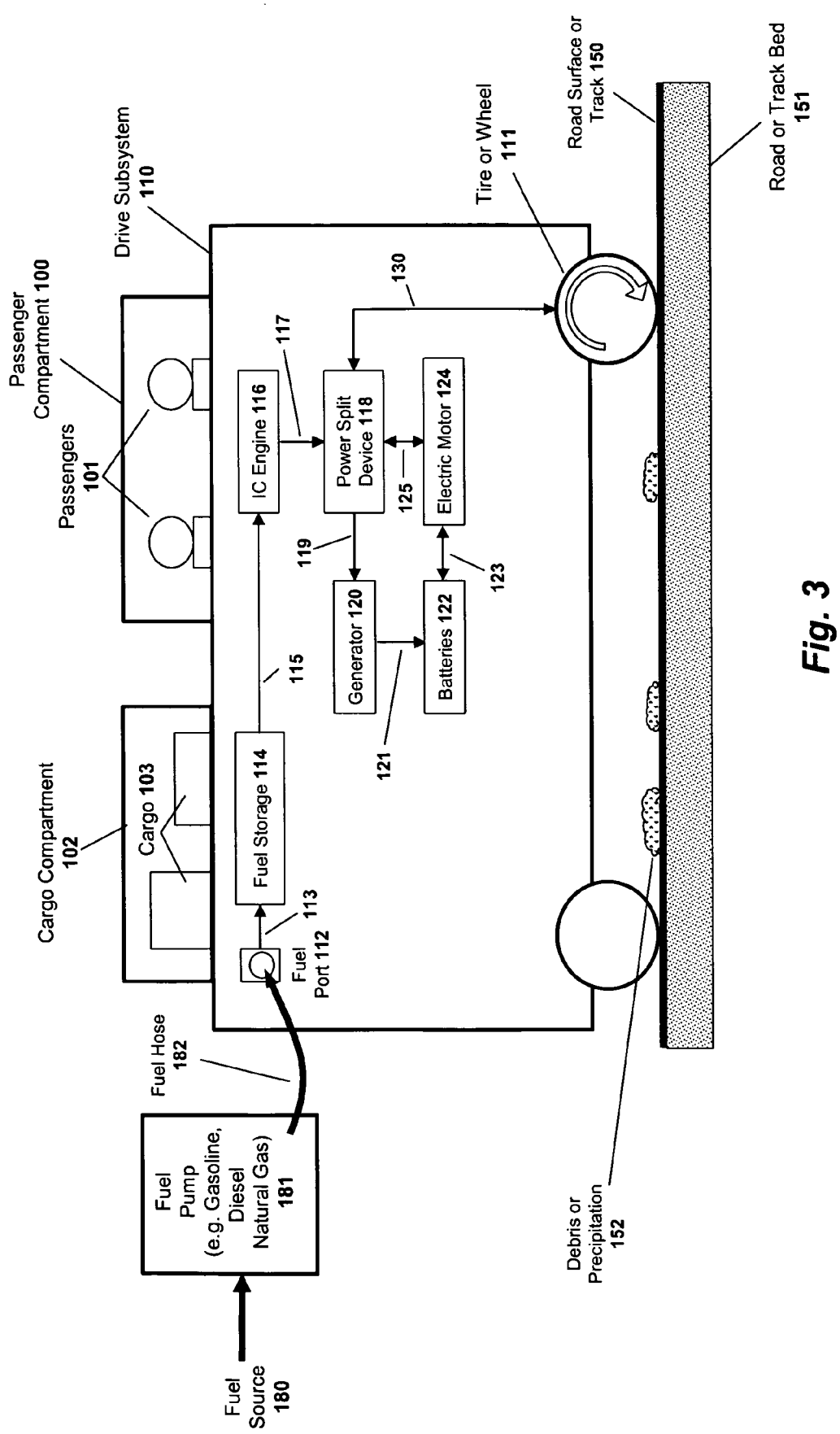
FIG. 3 illustrates a prior art IC-electric hybrid vehicle which is powered by both fossil fuel and batteries.
Figure 4:
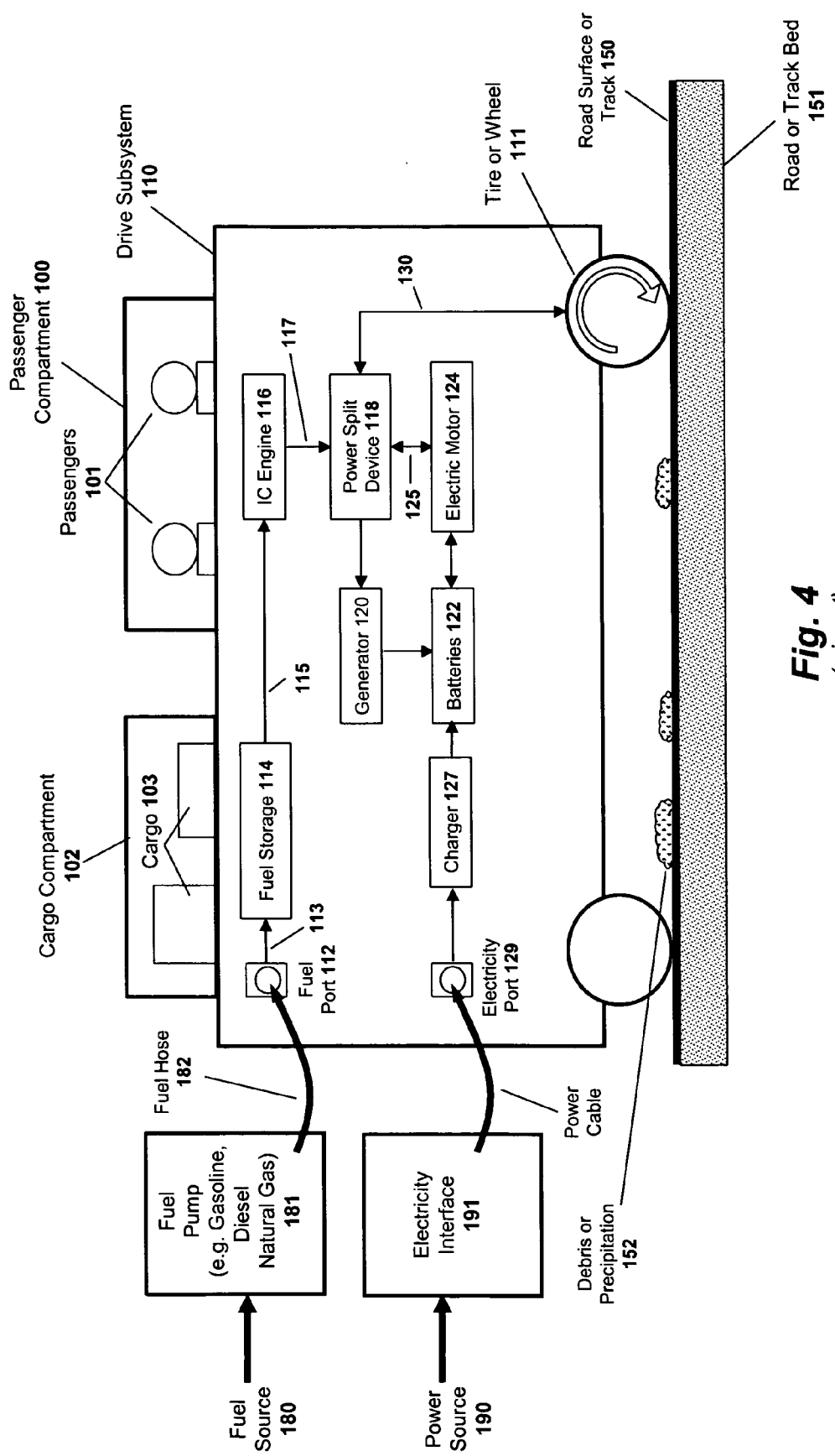
FIG. 4 illustrates a prior art "plug-in" IC-electric hybrid vehicle which can be charged via an electricity port.
Figure 5:
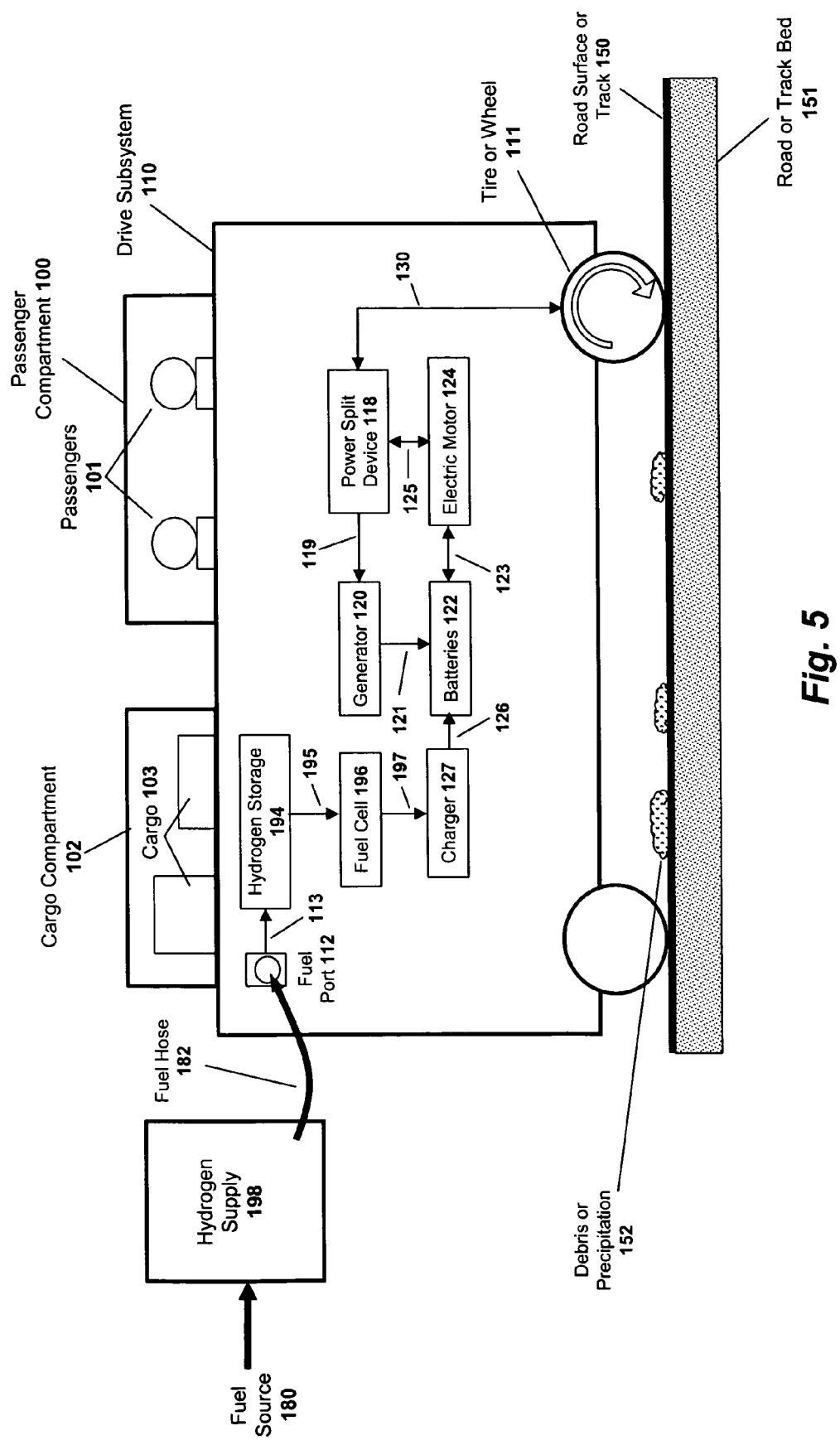
FIG. 5 illustrates a prior art hydrogen fuel cell vehicle which is powered by hydrogen.
Figure 11:
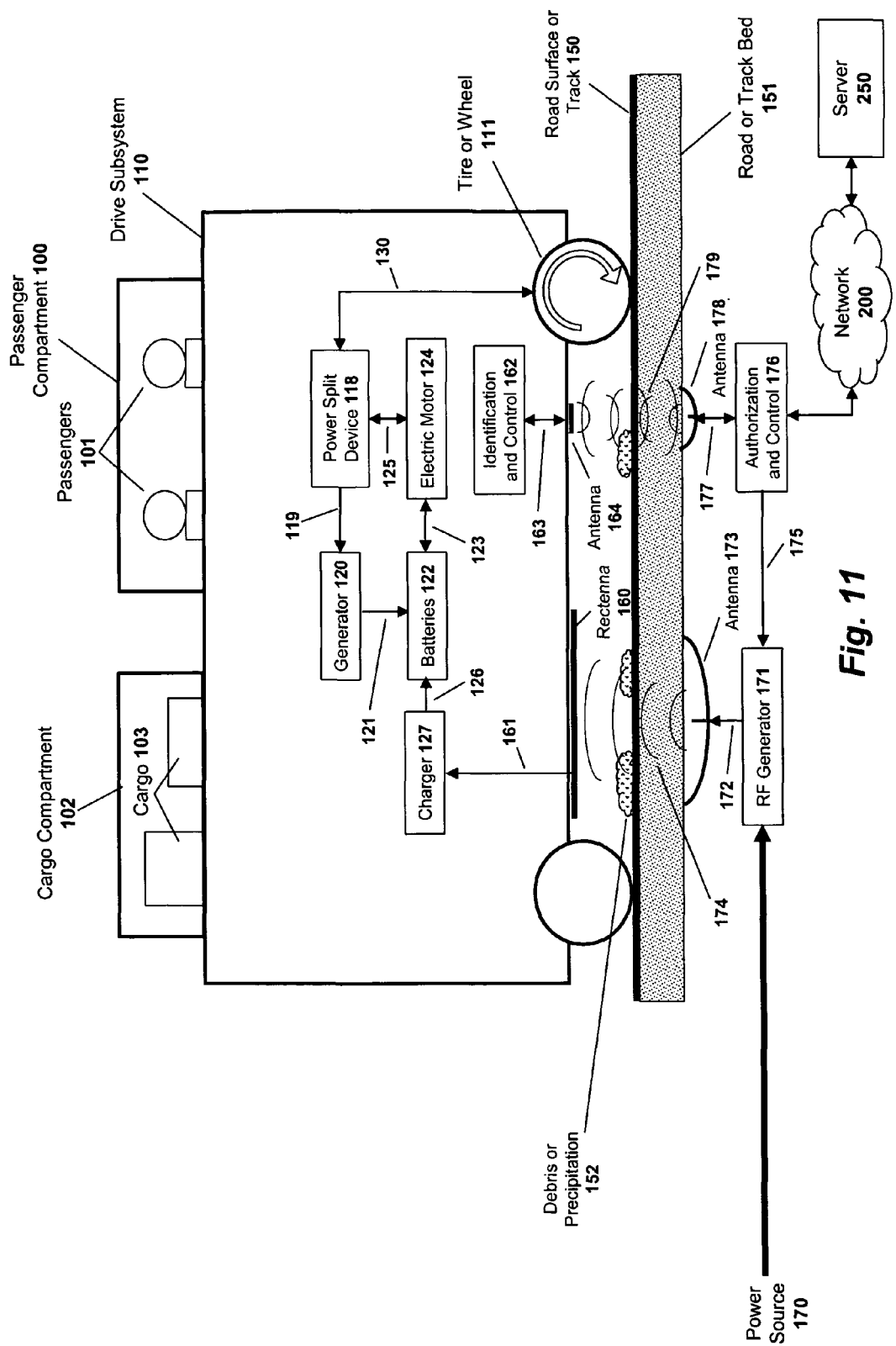
FIG. 11 illustrates one embodiment of the invention in which the only power source for a vehicle are RF generators configured beneath the road surface.

The embodiments in FIGS. 9 and 10 provide alternate power options in case the road over which the vehicle is traveling does not include RF generators 171. For example, the vehicles shown in FIGS. 9 and 10 could operate as conventional hybrid vehicles, such as those described in FIGS. 3 and 4 when on roads which do not include RF generators. However, when a large percentage of all roadways have been configured with RF generators, vehicles may be produced which rely upon RF power most of the time, and run on batteries 122 during the short stretches of roadway where RF power is not available. As illustrated in FIG. 11, this type of vehicle does not have an IC engine or an alternate input for charging the set of batteries 122. In an alternative embodiment, the vehicle illustrated in FIG. 11 may have an additional port for physically attaching electric power for use in areas were RF-powered roadways are not commonly available.

Antenna Array Processing for Powering a Vehicle

Figure 16:
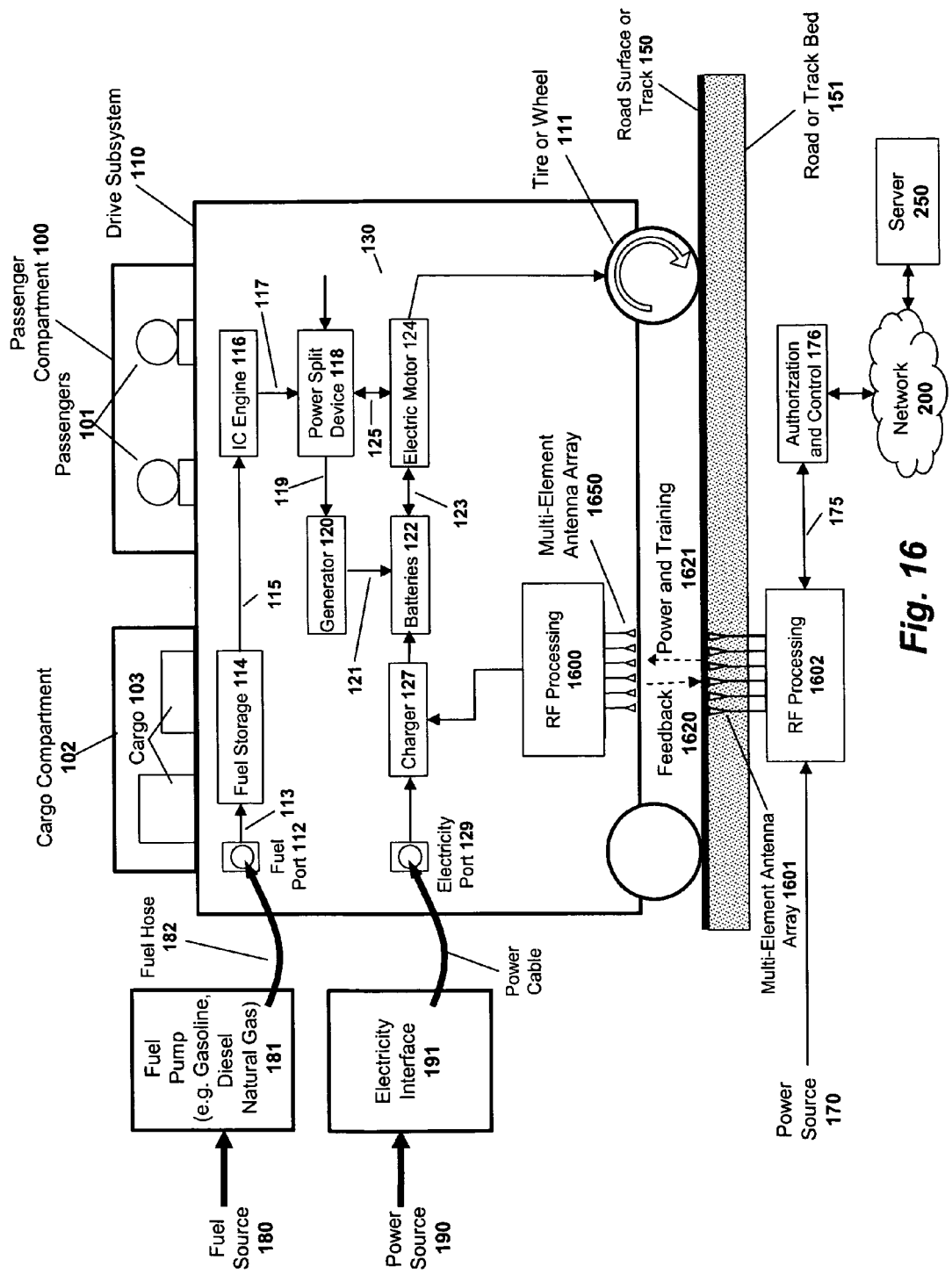
FIG. 16 illustrates one embodiment of the invention which employs spatial multiplexing and/or space-time coding to power a vehicle.

FIG. 16 illustrates one embodiment of the invention which employs spatial multiplexing and/or space-time coding to power a vehicle. For example, in FIG. 16 a multi-element antenna array 1601 under (or on) the road surface 150 transmits power and/or pilot (i.e. training) signals 1621 to a multi-element antenna array 1650 disposed on the underside of the vehicle. In the reverse direction, the multi-element antenna array 1650 on the vehicle transmits feedback signals 1620 to the multi-element antenna array 1601 under the road surface 150.

In one embodiment, the pilot signals (also referred to as "training" signals) received by the multi-element antenna array 1650 on the vehicle are used to calculate channel state information which characterizes the current state of the communication channels between each of the transmit/receive antenna elements 1601, 1650. In particular, RF processing logic and circuitry 1600 on the vehicle determines the channel state information (e.g., using techniques described below) and transmits the channel state information to the RF processing logic and circuitry 1602 under the road surface. The RF processing logic and circuitry 1602 under the road surface then uses the channel state information to determine an optimal transmission pattern for transmitting power to the vehicle. As described in some of the embodiments below, the feedback signal may be transmitted over a separate wireless channel (e.g., such as the low rate feedback channel 1810 shown in FIGS. 18-19). Additional details of the operations performed by the RF processing circuitry 1600, 1602 are provided below.

The embodiments of the invention which employ spatial multiplexing and space-time coding address at least three limitations found in prior wireless power systems: (i) unequal power distribution at the rectenna array (due to narrow transmit beam pattern or multipath fading); (ii) a discontinuous power supply to the rectenna due to moving vehicle; and (iii) limited throughput for data transmission to the vehicle when using single antenna at transmit and receive sides. These issues are solved via antenna array processing techniques as described below. Note that while the embodiments described herein employ processing techniques "under the road surface," the processing techniques may be performed in other locations while still complying with the underlying principles of the invention (e.g., in an enclosure above and on the side of the road).

1. TECHNIQUES FOR DELIVERING UNIFORM POWER DISTRIBUTION TO THE RECTENNA ARRAY

One measure of the efficiency of the system depicted in FIG. 16 is the "collection efficiency," defined as the ratio between the power collected at the multi-element antenna array 1650 and the power radiated by the multi-element antenna array 1601. When the energy distribution across the rectennas of an array 1650 is not uniform, the system in FIG. 16 may experience loss in "collection efficiency". Two reasons why this unequal power distribution may occur are:

The radiation pattern of the transmit antenna 173 is not uniform over the range of angles that span the surface of the rectenna array. This power distribution depends on the geometry of the rectenna array, height of the array from the ground, and width of the radiation pattern of the antenna 173 (typically measured in terms of −3 dB beamwidth or $BW_{-3\ dB}$). For example, if antenna 173 is an H-plane sectoral horn with $BW_{-3\ dB}=120°$ (along the E-plane) and the length of the rectenna array is 6λ (with λ being the wavelength), the optimal height for uniform power distribution (within a tolerance of −3 dB) over the array is about 2λ. In practical scenarios the height and size of the rectenna array may vary depending on the size of the vehicle. Hence, a mechanism to adaptively adjust the antenna radiation pattern to the rectenna array geometry is required.

Depending on the frequency of operation, material makeup of the vehicle bottom surface (where the rectenna is mounted), and height of the rectenna array, the radiated energy may undergo multiple reflections between the vehicle and the road. These multiple reflections (or multipaths) may yield severe (spatial) fading effects that manifest as uneven power distribution at the rectennas, due to constructive and destructive interference of the multipaths. One way to compensate for this fading effect is to employ beamforming and/or combining techniques by exploiting full or partial channel state information (CSI).

Hereafter, we describe different techniques to focus the RF energy towards the rectenna array resulting in increased collection efficiency.

1.A Reconfigurable Antennas with Feedback Information

As pointed out before, using high gain antenna to radiate RF energy towards the rectenna is limited by the fact that the rectenna geometry and height from the ground may vary, resulting in uneven power distribution. To overcome this issue, reconfigurable antennas may be used to adapt the shape of the radiation pattern to different conditions. Practical designs of reconfigurable antennas are based on microelectromechanical systems (MEMS) technology [1-2], spiral microstrip antennas [3-4], parasitic antennas [5], and PIN diode switches [6]. The foregoing numbered citations are provided at the end of this detailed description and are incorporated herein by reference.

Figure 17:
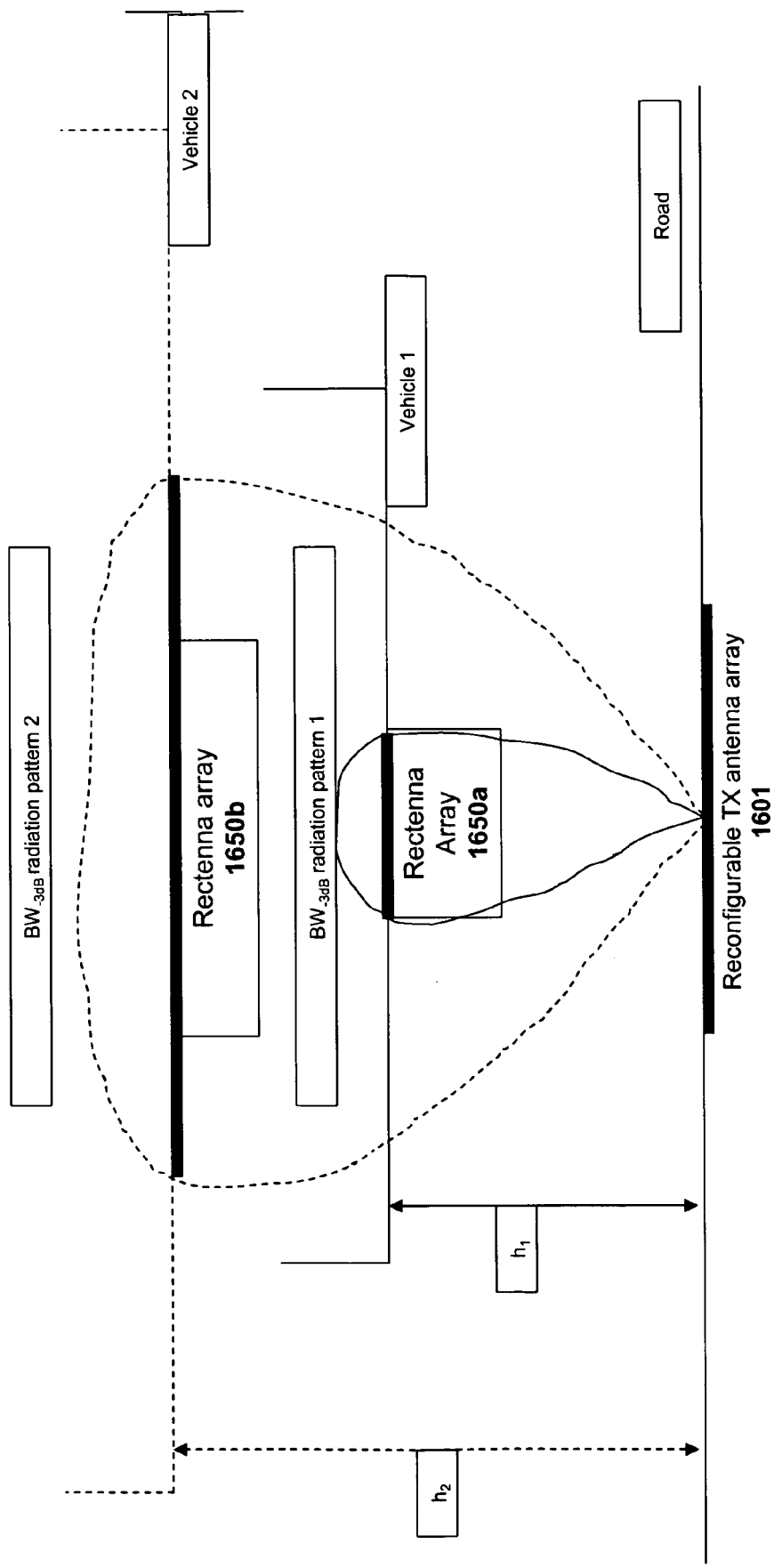
FIG. 17 illustrates examples in which the antenna radiation pattern is dynamically adjusted to the height and geometry of the rectenna arrays to provide uniform power distribution.

FIG. 17 shows one example where the $BW_{-3\ dB}$ of the antenna radiation pattern is dynamically adjusted to the height ($h_1$, $h_2$) and geometry of the rectenna arrays 1 (1650a), 2 (1650b) to provide uniform power distribution to the rectenna for different types of vehicles. For example, rectenna array 2 may be used on a large truck with a relatively large distance from the roadway whereas rectenna array 1 may be used on a small car with a relatively short distance to the roadway.

Figure 18:
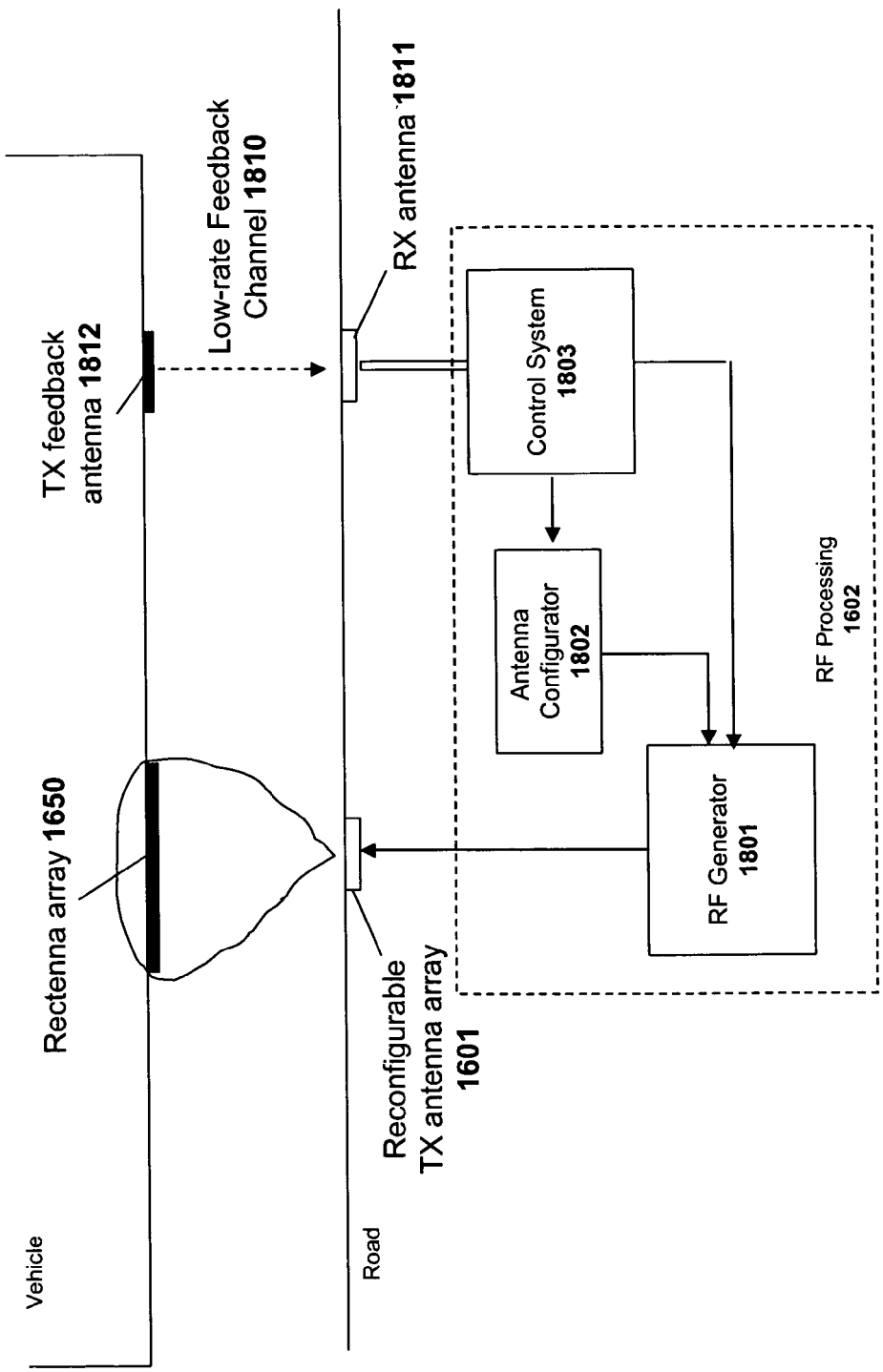
FIG. 18 illustrates one embodiment of a system for powering a vehicle using a feedback channel.
Figure 19:
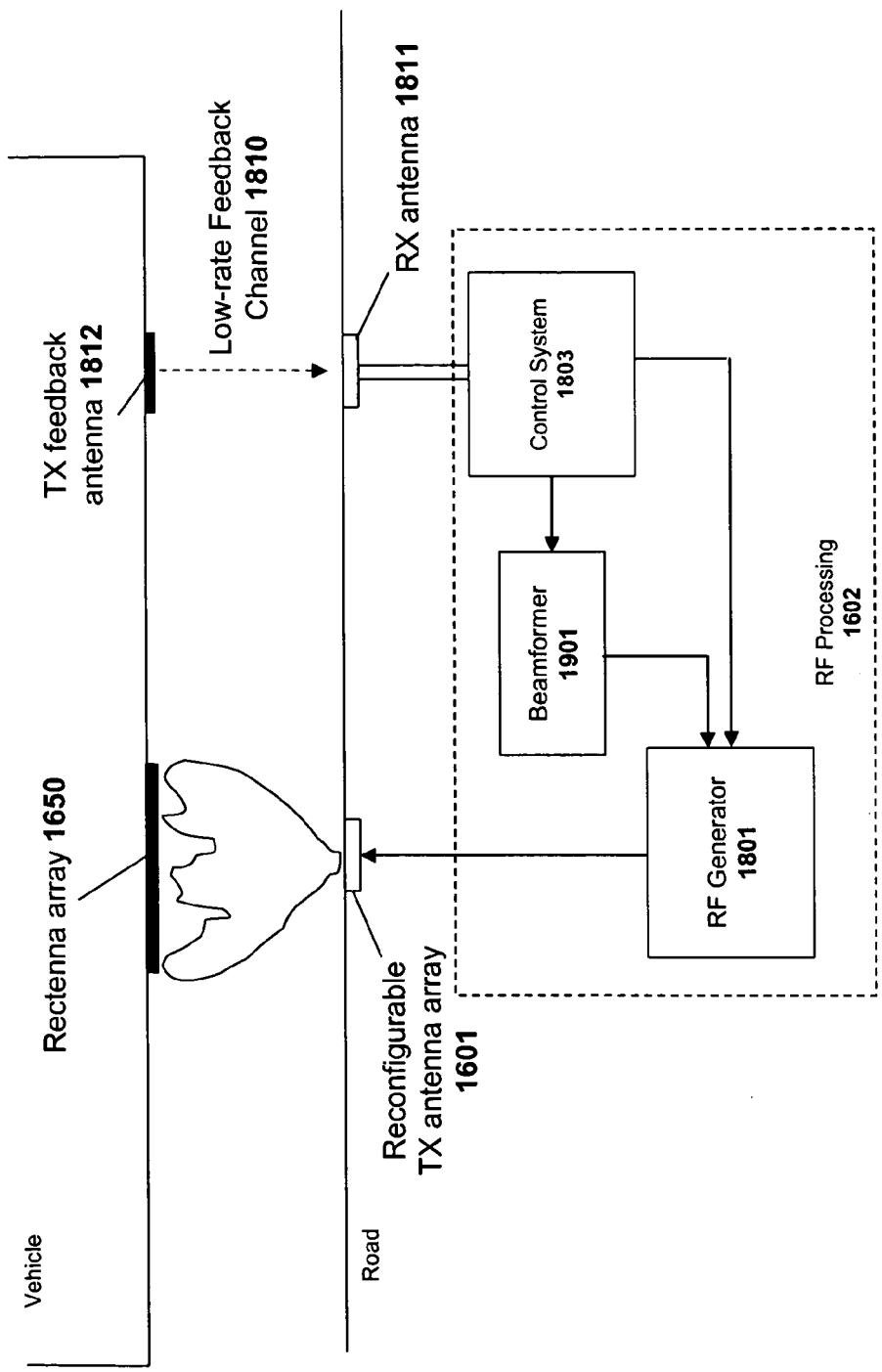
FIG. 19 illustrates another embodiment of a system for powering a vehicle using a feedback channel and a beamformer.

To enable this adaptation mechanism, the vehicle must provide information regarding the rectenna array (i.e., geometry, height from the ground, etc.) to the RF processing circuitry 1602 under the road surface. In one embodiment, this is accomplished using a low rate (i.e. low data rate) RF control channel 1810 as illustrated in FIG. 18. In FIG. 18, a separate feedback antenna 1812 on the vehicle transmits the channel information to a receive antenna 1811 on or under the roadway. Alternatively, as mentioned above with respect to FIG. 16, one or all the antennas of the multi-element arrays 1650, 1601 may provide the feedback information. Regardless of the particular channel used, in one embodiment, the same antennas used to transmit the feedback information are also used to transmit authentication data described herein (i.e., for providing access to the power system described herein).

The RF processing circuitry 1602 under the road surface processes the feedback information to reconfigure the antenna array 1601 as shown in FIG. 18. For example, based on the feedback information, an antenna configurator unit 1802 selects the optimal radiation pattern that satisfies certain performance criteria (e.g., to maximize the received power). The RF generator 1801 then generates the optimal radiation pattern.

1.B Beamforming Techniques with Channel State Information (CSI) Feedback

As described above, one technique to compensate for fading effects is beamforming. The general analytical model for beamforming systems equipped with M transmit and N receive antennas is $$y=z^H H w x+z^H n \qquad (1)$$

where x is the transmit signal (if no data is transmitted over the channels between the roadway and vehicle, x may be a sinewave) where $P_x=E\{|x|^2\}$ is the average transmit power, $H \in C^{N \times M}$ is the complex channel matrix, $n \in C^{N \times 1}$ is the noise vector with complex Gaussian distribution with zero mean and variance $N_0$, y is the received signal, $w \in C^{M \times 1}$ is the transmit beamforming vector, and $z \in C^{N \times 1}$ is the receive beamforming vector.

In one embodiment, the unitary vectors w and z are chosen to guarantee maximum power transfer to the receive rectenna array or equivalently maximum signal-to-noise ratio (SNR). For additional technical details related to these techniques, see citations [7-9] below, which are incorporated herein by reference.

$$SNR = \frac{P_x|z^H Hw|^2}{N_0 \|z\|_2^2} \quad (2)$$

This is achieved by computing the receive weight vector from the maximum ratio combining (MRC) criterion $$z = \frac{Hw}{\|Hw\|_2} \quad (3)$$

and the optimal transmit weight vector according to the criterion $$w_{opi} = \underset{w \in W}{\mathrm{argmax}} \|Hw\|_2 \quad (4)$$

where W is the feasible set of the optimization problem. For maximum ratio transmission (MRT) the solution to equation (4) is given by the dominant right singular vector of H (corresponding to the largest singular value of H). See, e.g., citations [7,10], for additional technical background.

It is observed that the solution to (4) adapts the beamforming weight in amplitude and phase, and requires full channel state information (CSI) at the transmitter. One simplified version of this precoding technique adapts only based on phase information (referred to herein as "partial CSI"), as for typical phased-array systems. In this case the general expression of the transmit beamforming vector is $$w = \frac{1}{N_i} \exp(j\varphi) \quad (5)$$

where $\phi$ is the vector of the phase for each of the transmit antennas computed from direction of departure (DOD) information.

The general framework of the beamforming system described above is depicted in FIG. 19. In this embodiment, the transmit array 1601 sends training signals to the rectenna to estimate the CSI. After processing the training signal, the CSI is transmitted from the vehicle to the control system via wireless feedback channel 1810. Alternatively, the CSI can be transmitted from the rectenna to the array mounted on the road, assuming both transceivers are equipped with transmit and receive RF chains. Then the CSI is processed by a beamformer unit 1901 to compute the optimal beamforming weights. The RF generator 1801 uses the weights to precode the RF signals. As a result, the transmit array 1601 focuses the RF energy towards the rectenna array on the vehicle and compensates for multipath fading effects.

2. METHODS TO DELIVER CONTINUOUS POWER SUPPLY TO MOVING VEHICLES

When only one antenna at a time is used to radiate RF energy to the rectenna, the vehicle may experience periods of power outage until the next antenna on the road is triggered for transmission by the control system 1803. It may be desirable, however, to provide a continuous RF power supply to the vehicle. One way to accomplish this is by using an antenna array on the road that adaptively adjusts its radiation characteristics as the car moves. Once again, this solution may exploit partial or full CSI.

2.A Beam Sweeping with Limited Feedback Information

One way to provide continuous power transmission to the rectenna is to sweep the transmit beam towards the direction of the rectenna as the vehicle moves on the road. The sweeping processing can be done by dynamically changing the phases of the antennas in the transmit array according to the criterion described in equation (5) above. To compute the optimal phase vector in (5), the controller exploits feedback information sent by the vehicle (i.e., array geometry, height, speed of the vehicle, etc.). Alternatively, the RF processing circuitry 1602 may compute some of this information as the vehicle passes by.

Figure 20:
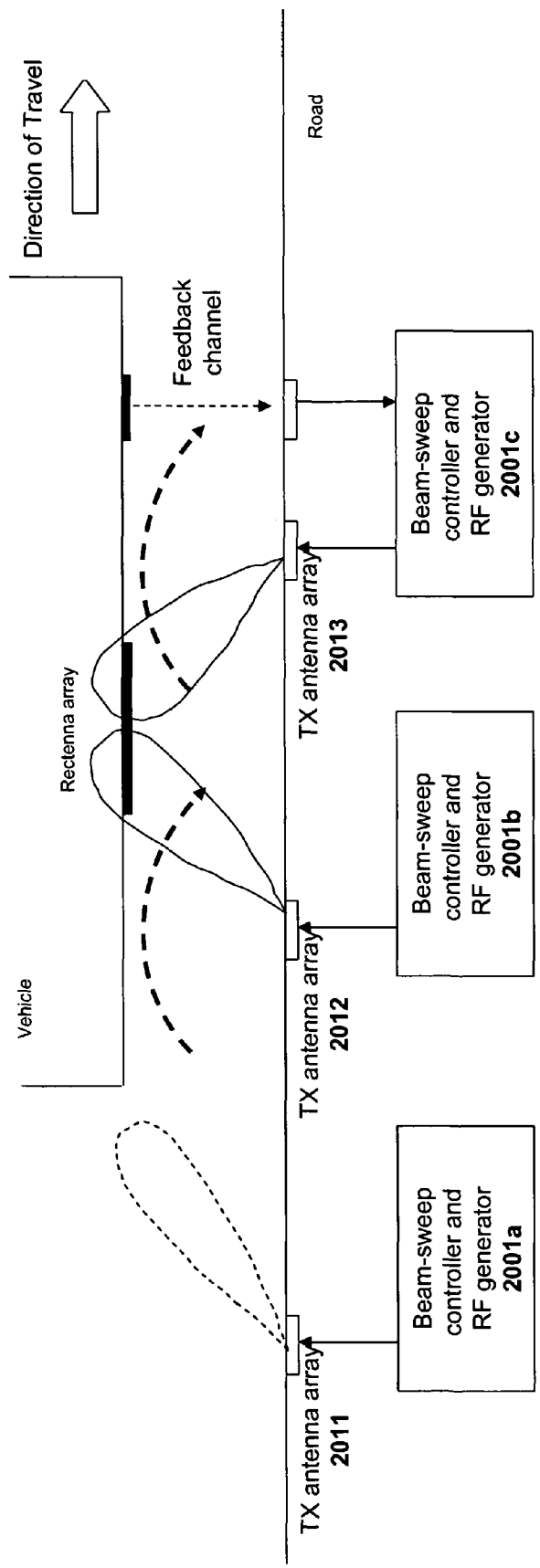
FIG. 20 illustrates beam sweeping techniques employed in one embodiment of the invention.

The framework of this system is illustrated in FIG. 20, which shows multiple beam-sweep and RF generators 2001a-c providing RF power to a moving vehicle. Transmit array 2011 is disabled because the vehicle has already passed over its coverage area. As the vehicle runs between the arrays 2012 and 2013 coverage areas, their respective beams sweep along predefined angles to guarantee continuous coverage on the boundary regions, as illustrated.

2.B Adaptive Beamforming with Full CSI Information

Figure 21:
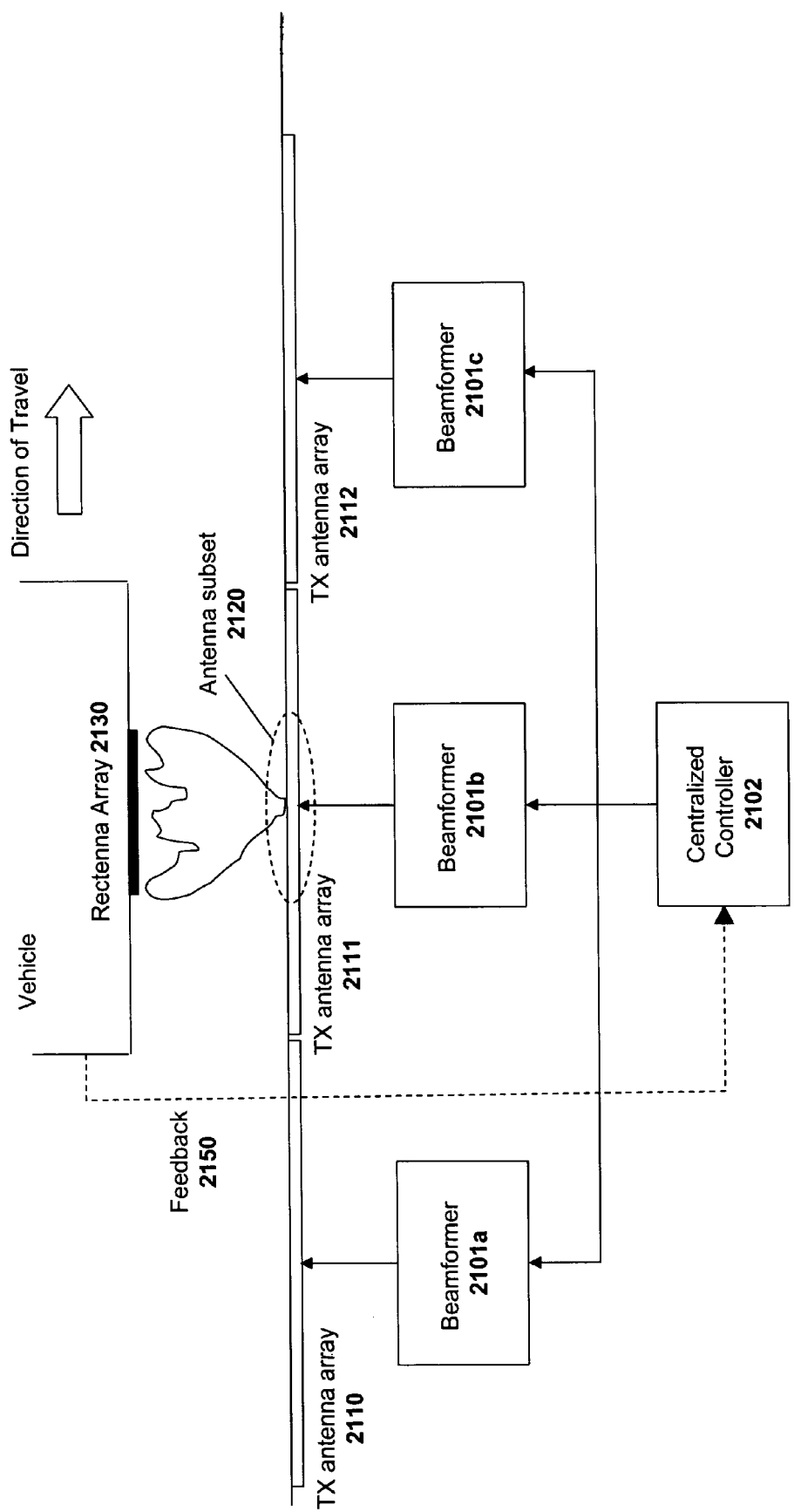
FIG. 21 illustrates a centralized controller for controlling a plurality of beanformers in one embodiment of the invention.

Another solution to track the location of the rectenna array as the vehicle moves on the road is to use arrays 2110-2112 distributed along the surface of the road as shown in FIG. 21. As in the system described in Section C above ("Beamforming Techniques with CSI Feedback"), the beamformer 1901 computes the optimal transmit weight vector based on the CSI information received by the vehicle. The beamformer may also apply antenna selection techniques such as those described in reference [11] (citation provided below) to select the optimal subset of transmit antennas 2120 within the array that maximizes the SNR in equation (2) above. The length of the transmit array on the road is arbitrary. For example the length of the array may be approximately equal to the typical length of a vehicle. Several arrays 2110-2112 are located sequentially to cover the surface of the highway. These arrays are all connected to the same centralized controller 2102 to enable adaptive switching between arrays as the car moves from one array to the next. In one embodiment, the centralized controller switches between arrays in accordance with the feedback signal 2150 provided from the vehicle. As previously mentioned, the feedback signal may contain both authentication data and channel state information and may be provided over the antenna arrays 2110-2111 or over a separate channel. The underlying principles of the invention remain the same regardless of how the feedback information is communicated to the controller 2102.

The adaptation rate of the array depends on the speed of the vehicle. For example, if power is transmitted at 2.45 GHz and the vehicle is driving at v=70 mph, the Doppler shift is about $f_d=v/\lambda=255$ Hz, corresponding to channel coherence time of approximately $T_c=2$ msec. Hence, the adaptation rate must be approximately less than $T_c/10=200$ microsec.

3. ADDITIONAL TECHNIQUES TO ENHANCE THROUGHPUT IN RF POWER SYSTEMS

In single-input single-output (SISO) systems, the capacity that wireless links can support is upper bounded by the Shannon capacity formula. It is well known that in multipath fading channels the spatial diversity can be exploited by multiple-input multiple-output (MIMO) systems to increase system capacity [12]. In the embodiments described herein, the channel between the road and the rectenna is expected to be rich in multipath due to the multiple reflections between the road and the (typically metallic) bottom surface of the vehicle. Hence, one way to improve the throughput of the communication link from the vehicle is by using MIMO techniques. Moreover, orthogonal polarizations of the radiated electromagnetic field can be exploited if cross-polarized antennas are used at transmit and receive sides.

3.A Spatial Diversity

The input-output relation of precoded MIMO systems (with perfect CSI knowledge) with M transmit and N receive antennas is given by $$y = HWx + n \quad (1)$$

where $x \in C^{Q \times 1}$ is the transmit signal vector with $P_x = E\{xx^H\}$ being the average transmit power and $Q \leq \min(M, N)$, $H \in C^{N \times M}$ is the complex channel matrix, $n \in C^{N \times 1}$ is the noise vector with complex Gaussian distribution with zero mean and variance $N_0$, $y \in C^{N \times 1}$ is the received signal vector and $W \in C^{M \times Q}$ is the transmit precoding matrix, computed according to given performance criterion and constraints (e.g., capacity-based design, etc.).

Figure 22:
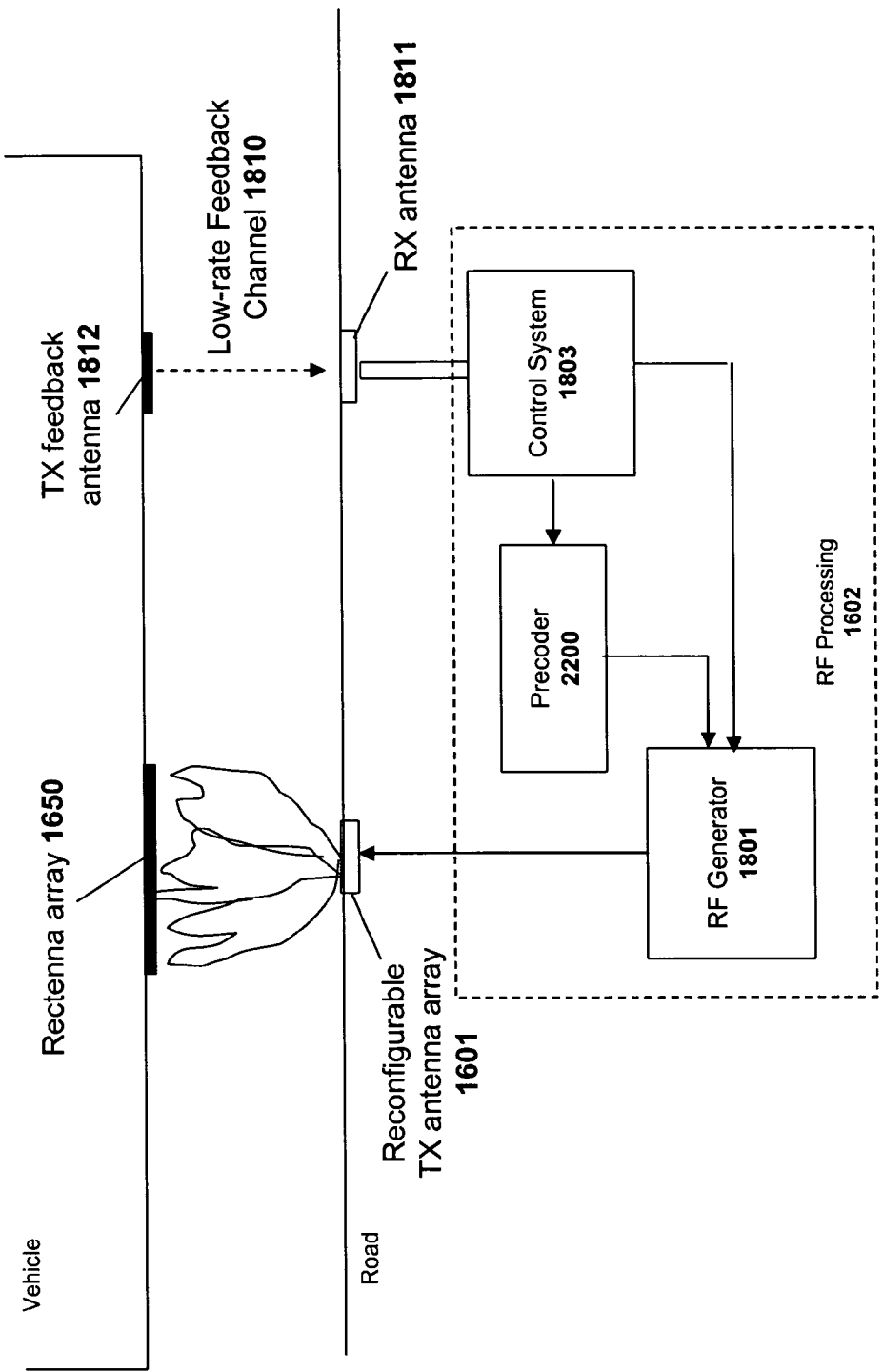
FIG. 22 illustrates one embodiment of the invention which employs precoded MIMO techniques for powering a vehicle.

One embodiment of a framework of precoded MIMO systems for RF power applications such as those described herein is depicted in FIG. 22. In a similar manner to the beamforming system in FIG. 18, the precoder 2200 in FIG. 22 exploits the CSI feedback information from the vehicle to compute the optimal precoding weights. Then, responsive to the RF generator 1801 Q parallel data streams are sent from the transmit array via Q orthogonal weights that create multiple non-interfering data pipes to the receive rectenna array 1650. In one embodiment, linear or non-linear receivers are used at the receiver to demodulate the multiple data streams. This technique can be extended to adapt the weight as the vehicle moves, by using similar techniques described in Section 2 above.

3.B Polarization Diversity

Another source of diversity in MIMO channels is cross-polarization [13-15]. In this case, the antennas are cross-polarized both at transmit and receive sides to yield non-interfering links between the vehicle and the road. One embodiment of the invention employs polarization diversity in addition to (or in lieu of) the techniques described above.

4. RF PROCESSING FACILITIES

While the Antenna Array processing embodiments generally characterize the RF processing systems 1602, 2001a-c, 2102, etc. as being located under the roadway, in alternative embodiments, the RF processing systems are located in facilities (e.g. equipment sheds) alongside the roadway, or in facilities near the roadway (e.g. in a building in the general vicinity of the roadway), or even in facility that is some distance away from the roadway (e.g. in a building within the same geographic region of the roadway). And, in some embodiments the RF processing equipment in such facilities provides processing for multiple antenna arrays 1601 serving multiple vehicles at once. An advantage of sharing RF processing facilities in such a manner is that in a typical roadway scenario, only a fraction of the antenna arrays 1601 are in use at a given time since there typically will be gaps between cars, even in heavy traffic, and because there may well be conventional vehicles that are not equipped to receive RF power sharing the roadway. Thus, if only 10% of the antenna arrays 1601 are in use at a given time, then if the RF processing resources are shared, then only $\frac{1}{10}^{th}$ the number of RF processing systems would be needed, substantially reducing the cost of the system.

One constraint that does exist if the RF processing relies upon CSI feedback is that the RF Processing systems need to be located close enough to the antenna arrays 1601 so that the entire feedback loop can be completed within the channel coherence time. Given the communications medium (e.g. optical fiber, twisted pair copper, RF through air, etc.) used between the antenna arrays 1601 and the RF Processing system, the propagation delay of an optical, electrical, or RF signal through such medium will establish a limit to the distance which a RF Processing facility can be located relative to the antenna arrays it is serving.

5. DEDICATED SHORT RANGE COMMUNICATIONS SPECTRUM AT 5.9 GHz

One consideration for the system described herein is the available spectrum for roadway RF power transmission. The Federal Communications Commission allocated spectrum at 5.9 GHz for use by the Department of Transportation (DOT) for Dedicated Short Range Communications (DSRC) for safety applications, including receiving and transmitting real-time information from moving vehicles. Some planned use of this spectrum is described in [16]. Applications within this spectrum include collecting traffic congestion information and alerting vehicles as to weather and road conditions. Since this spectrum is already allocated for transmission of real-time information relating to moving vehicles, it could be readily utilized for both its originally planned purposes and for power transmission. For example, in one embodiment, the training signals 1621 contain data intended to be communicated to the vehicle (e.g. weather and road conditions), and the feedback data 1620 is augmented with data from the vehicle (e.g. its current speed and position). Then, the same 5.9 GHz DSRC spectrum could be used for power transmission. Thus, no new spectrum would need to be allocated to the DOT to implement roadway power transmission, and further, this would reduce the need for the DOT to install transmission/receiving systems to implement the intended applications for the 5.9 DSRC spectrum.

6. ROADWAY RF-POWERED FLYING VEHICLES

Although in peak traffic situations, today's roadway vehicles get very close to each other (i.e. almost "bumper to bumper"), when vehicles are moving at significant speed, there are generally gaps between them to allow for driver reaction time and braking distance. And, with light traffic, of course, there are very wide gaps between cars.

Roadway vehicles today are designed with tires that roll on the road bed and support the weight of the vehicle. It is possible to design a vehicle 2301 or 2302 in FIG. 23 that could both roll on tires on roadways part of the time and fly over the roadways at low altitudes part of the time (e.g. when there are few obstructions, such as on a long stretch of highway). Such a vehicle could achieve much higher speeds than would be feasible on a roadway, and it would potentially reduce congestion, since it would adding one or more "lanes" vertically to the roadway where flying vehicles would fly over non-flying vehicles. There are many practical difficulties that arise in designing such a vehicle 2301 or 2302. Among them is that such a vehicle might not be able to rely upon there being enough "runway" of roadway for an airplane-like take off. Consequently, these vehicles 2301, 2302 would likely need a means to lift directly upward in a helicopter-like fashion. Also, such a vehicle would have to be compact enough to fit in the lane of a roadway when driven in areas where it is not feasible to fly over the roadway for one reason or another.

In one embodiment, a flight-capable vehicle 2301 or 2302 utilizes RF power transmitted from the roadway to power motors or other propulsion technologies for flight. For example, if the vehicle had one or more propellers powered by one or more electric motors, then the vehicle would have a rectenna 2304 underneath, and would use power transmitted from the roadway to provide power to the motor(s), which would rotate the propeller(s) and propel the vehicle to become airborne and continue to fly. Because the vehicle in this embodiment is receiving its power from the roadway, this mitigates the need for the vehicle to carry heavy on-board fuel or batteries and would substantially reduce its weight.

Figure 23:
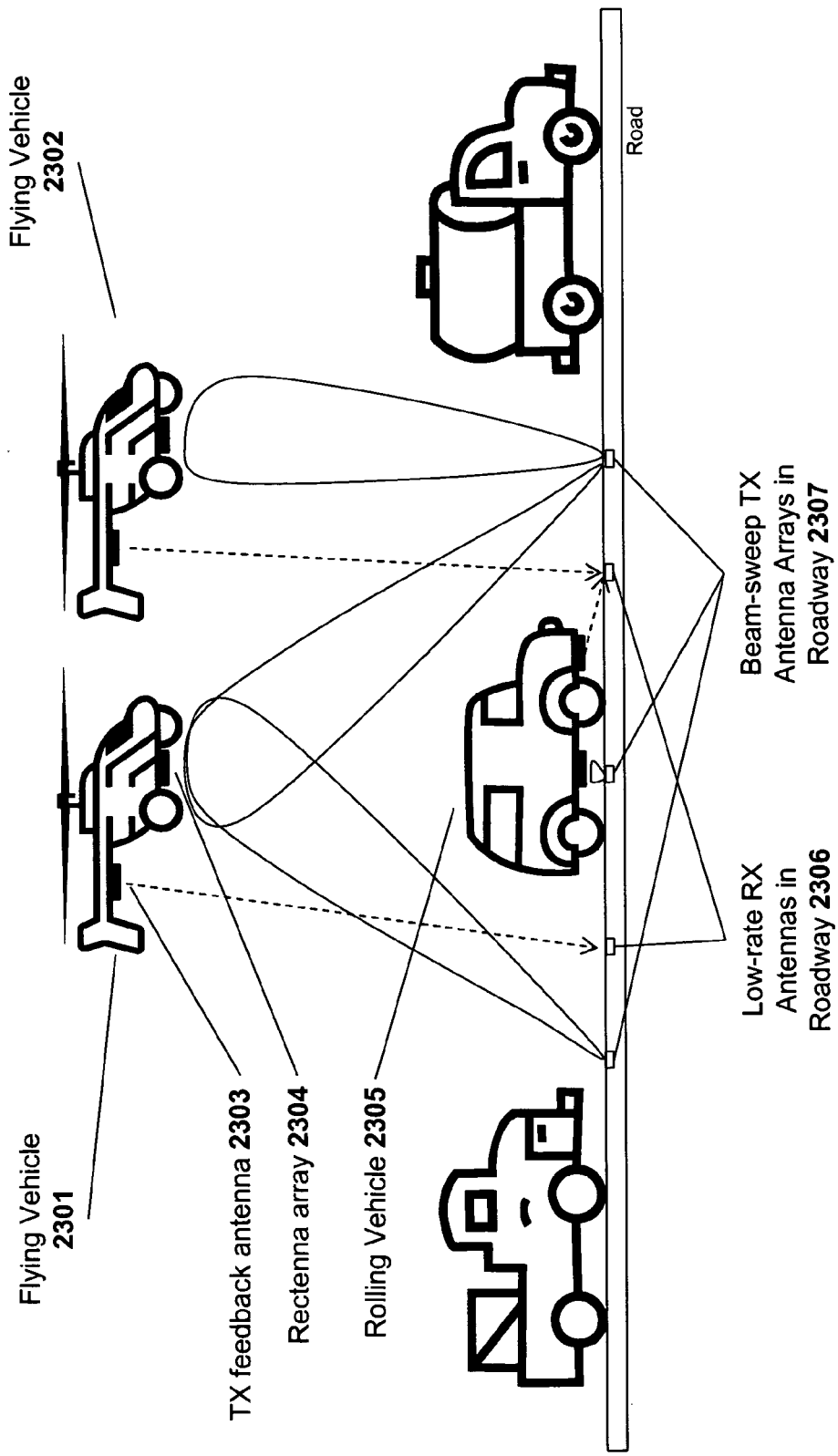
FIG. 23 illustrates one embodiment of the invention for powering aircraft.

In this embodiment, flying vehicle 2301 or 2302 receives power transmissions from the roadway from beam sweep antenna arrays 2307 (such as the antenna arrays 2011, 2012, 2013, and 1601 described above) that are between (i.e., not blocked by) cars that are rolling on the roadway. In a low traffic situation, most of the antenna arrays 2307 would be available to transmit power to a flying vehicle, but even in a high traffic situation where traffic is moving at a reasonable speed (i.e. not "bumper to bumper"), there will be gaps between the cars where antenna arrays 2307 would be unobstructed by vehicles on the road and available to transmit power to flying vehicles 2301 or 2302. In this embodiment, even when a flying vehicle 2101 flies over a rolling vehicle 2305 on the road obstructing the sweep antenna arrays 2307, the power transmission to the flying vehicle from the antenna arrays 2307 in the gaps between cars is angled over the vehicle 2305 on the road (as illustrated in FIG. 23) so as to provide continuous or nearly continuous power to the flying vehicle 2301.

As shown in FIG. 17 and described previously, because the antenna array 2307 (the same as antenna array 1601 in FIG. 17) is reconfigurable, based on the CSI feedback from TX feedback antenna 2303 to Low-rate RX antennas 2306, the RF radiation pattern will automatically be adjusted for any height. Thus, rectenna array 2304 (the same as 1650b in FIG. 17) could be, for example, 3 feet above the road in the case of a vehicle on the road (e.g. rolling vehicle 2305), or it could be, for example, 20 feet above the road in the case of flying vehicle 2301 or 2302. And, of course, when a flying vehicle comes back down to the road to rest on wheels, then the RF radiation pattern would be adjusted to a lower height.

In one embodiment, control information for the flying vehicle is transmitted to the flying vehicle from the roadway antennas 2307, and information about the status of the flying vehicle is transmitted back to the roadway antennas 2306, just as moving vehicle data communications is communicated, as described previously, and uses the same DSRC spectrum at 5.9 GHz. In this way, flying vehicles 2301 and 2302 may be flown automatically by automatic pilot flight control systems. In many ways, automatically controlling a flying vehicle 2301 or 2302 by computers is easier than automatically controlling a driving vehicle on the road since, for example, (a) all of the flying vehicles may be required to be controlled by coordinated automatic pilot systems (i.e., there would be no "human" pilots operating independently), and (b) there are fewer uncertainties like road obstacles/debris, pedestrians, etc., in the air.

Thus, the above-described embodiment would enable automatically controlled flying RF-powered vehicles 2301 and 2302 to co-exist with both RF-powered and non-RF-powered vehicles rolling on the roadway, utilizing the same antenna array power transmission infrastructure as that provisioned for RF-powered rolling vehicles such as 2305.

The same roadway-based RF transmission infrastructure could be used to power aircraft flying at higher altitudes, so long as the aircraft stays within line-of-sight of an RF-powered roadway. For example, if an aircraft's flight path roughly followed the path of Interstate 80, and that highway were enabled with RF transmission infrastructure as described herein, that aircraft could be powered by RF power from Interstate 80. This would allow many commercial flights to be powered entirely or partially by RF, dramatically reducing the weight of the aircraft (since it would need to carry far less fuel), and also dramatically reducing polluting or greenhouse gas emissions, since the aircraft would be largely powered by electric motors rather than fossil fuel-powered engines.

7. REFERENCES

The following citations are identified in the detailed description above using a bracketed number. These references are incorporated herein by reference.

[1] W. H. Weedon, W. J. Payne, and G. M. Rebeiz, "MEMS-switched reconfigurable antennas," IEEE Antennas and Propagation Society, AP-S International Symposium (Digest), vol. 3, pp. 654-657, 2001.

[2] B. A. Cetiner, H. Jafarkhani, J. Y. Qian, H. J. Yoo, A. Grau, and F. De Flaviis, "Multifunctional reconfigurable MEMS integrated antennas for adaptive MIMO systems," IEEE Communications Magazine, vol. 42, no. 12, pp. 62-70, 2004.

[3] G. H. Huff, J. Feng, S. Zhang, and J. T. Bernhard, "A novel radiation pattern and frequency reconfigurable single turn square spiral microstrip antenna," IEEE Microwave and Wireless Components Letters, vol. 13, no. 2, pp. 57-59, 2003.

[4] B. A. Cetiner, J. Y. Qian, G. P. Li, and F. De Flaviis, "A reconfigurable spiral antenna for adaptive MIMO systems," Eurasip Journal on Wireless Communications and Networking, vol. 2005, no. 3, pp. 382-389, 2005.

[5] M. Wennstrom and T. Svantesson, "An antenna solution for MIMO channels: The switched parasitic antenna," IEEE International Symposium on Personal, Indoor and Mobile Radio Communications, PIMRC, vol. 1, pp. 159-163, 2001.

[6] D. Piazza, N. J. Kirsch, A. Forenza, R. W. Heath, Jr., and K. R. Dandekar, "Design and Evaluation of a Reconfigurable Antenna Array for MIMO Systems," *IEEE Transactions on Antennas and Propagation*, vol. 56, no. 3, pp. 869-881, March 2008.

[7] P. A. Dighe, R. K. Mallik, and S. S. Jamuar, "Analysis of transmit receive diversity in Rayleigh fading," *IEEE Trans. Comm.*, vol. 51, pp. 694-703, April 2003.

[8] J. Bach Anderson, "Antenna arrays in mobile communications: gain, diversity, and channel capacity," *IEEE Antennas and Prop. Magazine*, vol. 42, pp. 12-16, April 2000.

[9] M. K. Simon and M.-S. Alouini, *Digital Communications over Fading Channels*. New York: John Wiley & Sons, 2000.

[10] C.-H. Tse, K.-W. Yip, and T.-S. Ng, "Performance tradeoffs between maximum ratio transmission and switched-transmit diversity," in *Proc. 11th IEEE Int. Symp. on Personal, Indoor and Mobile Radio Comm.*, vol. 2, pp. 1485-1489, September 2000.

[11] Molisch, A. F.; Win, M. Z., "MIMO systems with antenna selection", IEEE Microwave Magazine, vol. 5, n. 1, pp. 46-56, March 2004

[12] I. E. Telatar, "Capacity of multi-antenna Gaussian channels," *European Trans. on Telecomm., vol.* 10, pp. 585-595, November 1999.

[13] M. R. Andrews, P. P. Mitra, and R. deCarvalho, "Tripling the capacity of wireless communications using electromagnetic polarization," *Nature*, vol. 409, pp. 316-318, January 2001.

[14] T. Svantesson, "On capacity and correlation of multi-antenna systems employing multiple polarizations," *Proc. IEEE Antennas and Prop. Symp.*, vol. 3, pp. 202-205, June 2002.

[15] T. Svantesson, M. A. Jensen, and J. W. Wallace, "Analysis of electromagnetic field polarizations in multiantenna systems," *IEEE Trans. Wireless Comm.*, vol. 3, pp. 641-646, March 2004.

[16] J. Wenger, J. Opiola, T. Ioannidis, "The Intelligent Highway: A Smart Idea?" *Strategy+Business, Booz|Allen|Hamilton*, Feb. 26, 2008. (http://www.strategy-business.com/media/file/leading_ideas-20080226.pdf)

Embodiments of the invention may include various steps as set forth above. The steps may be embodied in machine-executable instructions which cause a general-purpose or special-purpose processor to perform certain steps. Various elements which are not relevant to the underlying principles of the invention such as computer memory, hard drive, input devices, have been left out of the figures to avoid obscuring the pertinent aspects of the invention.

Alternatively, in one embodiment, the units and components illustrated herein and the associated steps may be performed by specific hardware components that contain hard-wired logic for performing the steps, such as an application-specific integrated circuit ("ASIC") or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. Accordingly, the scope and spirit of the present invention should be judged in terms of the claims which follow.

What is claimed is:

1. A method comprising:
    positioning a multi-element antenna array beneath or on a road surface of a roadway, the multi-element antenna array configured to transmit RF signals in an upward direction towards aircraft passing over the road surface of the roadway responsive to RF processing logic or circuitry;
    identifying a particular aircraft;
    determining whether the aircraft is authorized to receive the RF signals;
    selectively transmitting the RF signals only if the aircraft is authorized to receive the RF signals;
    coupling a multi-element rectenna array to an aircraft, the multi-element rectenna array configured to receive the RF signals transmitted from the multi-element antenna array and to generate power from the RF signals;
    providing feedback signals from the vehicle to the RF processing logic or circuitry if the particular aircraft is authorized to receive the RF signals, the feedback signals including channel state information (CSI) defining a current state of the channels between the multi-element antenna array and the multi-element rectenna array, the RF processing logic or circuitry using the channel state information to adjust the RF signal transmissions from the multi-element antenna array to improve the efficiency of the power generated by the multi-element rectenna array; and
    using the power generated by the multi-element rectenna array to power the aircraft.

2. The method as in claim 1 wherein using the channel state information to adjust the RF signal transmissions comprises:
    determining an optimal transmission pattern for transmitting power to the aircraft.

3. The method as in claim 2 further comprising:
    employing one or more beamforming techniques to determine the optimal transmission pattern.

4. The method as in claim 3 wherein the beamforming techniques comprise:
    compute a plurality of beamforming weights based on the channel state information; and
    precoding the RF signals using the weights prior to transmitting the RF signals from the multi-element antenna array to the multi-element rectenna array.

5. The method as in claim 3 further comprising:
    using the precoding techniques to sweep the RF signal towards the direction of the multi-element rectenna array as the aircraft moves above the road.

6. The method as in claim 1 wherein the CSI comprises both phase and amplitude information from all the antennas of the multi-element antenna array and the multi-element antenna array.

7. A system for powering an aircraft comprising:
    a multi-element antenna array positioned beneath or on a road surface of a roadway, the multi-element antenna array configured to transmit RF signals in an upward direction towards aircraft passing over the road surface of the roadway responsive to RF processing logic or circuitry;
    a plurality of authorization/control modules positioned beneath the road surface, the authorization/control modules configured to identify a particular aircraft, to further determine whether the aircraft is authorized to receive the RF signals, and to cause the RF generators to selectively transmit the RF signals only if the aircraft is authorized to receive the RF signals;
    a multi-element rectenna array coupled to an aircraft, the multi-element rectenna array configured to receive the RF signals transmitted from the multi-element antenna array and to generate power from the RF signals;
    RF processing logic or circuitry configured to receive feedback signals from the aircraft if the particular driver and/or aircraft is authorized to receive the RF signals, the feedback signals including channel state information (CSI) defining a current state of the channels between the multi-element antenna array and the multi-element rectenna array, the RF processing logic or circuitry using the channel state information to adjust the RF signal transmissions from the multi-element antenna array to improve the efficiency of the power generated by the rectenna array; and wherein the power generated by the rectenna array is used to power the aircraft.

8. The system as in claim 7 wherein using the channel state information to adjust the RF signal transmissions comprises: determining an optimal transmission pattern for transmitting power to the aircraft.

9. The system as in claim 8 wherein the optimal transmission pattern is computed to increase the power received at the multi-element rectenna array.

10. The system as in claim 8 wherein the optimal transmission pattern is computed to increase throughput.

11. The system as in claim 8 wherein the RF processing logic or circuitry employs one or more precoding techniques to determine the optimal transmission pattern.

12. The system as in claim 11 wherein the precoding techniques comprise:
computing a plurality of precoding weights based on the channel state information; and
precoding the RF signals using the weights prior to transmitting the RF signals from the multi-element antenna array to the multi-element rectenna array.

13. The system as in claim 11 wherein the RF processing logic or circuitry uses the precoding techniques to sweep the RF signal towards the direction of the multi-element rectenna array as the aircraft moves above the road.

14. The system as in claim 7 wherein the CSI comprises both phase and amplitude information from all the antennas of the multi-element antenna array and the multi-element antenna array.

* * * * *